Figure 23:
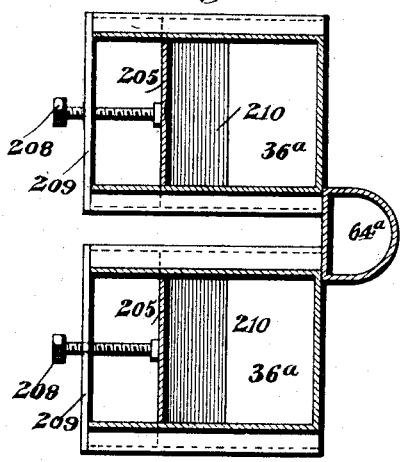

No. 628,894. Patented July 11, 1899.
J. & D. DE P. A. OUTCALT.
WEIGHING MACHINE.
(Application filed June 6, 1898.)
No Model. 8 Sheets—Sheet 1.
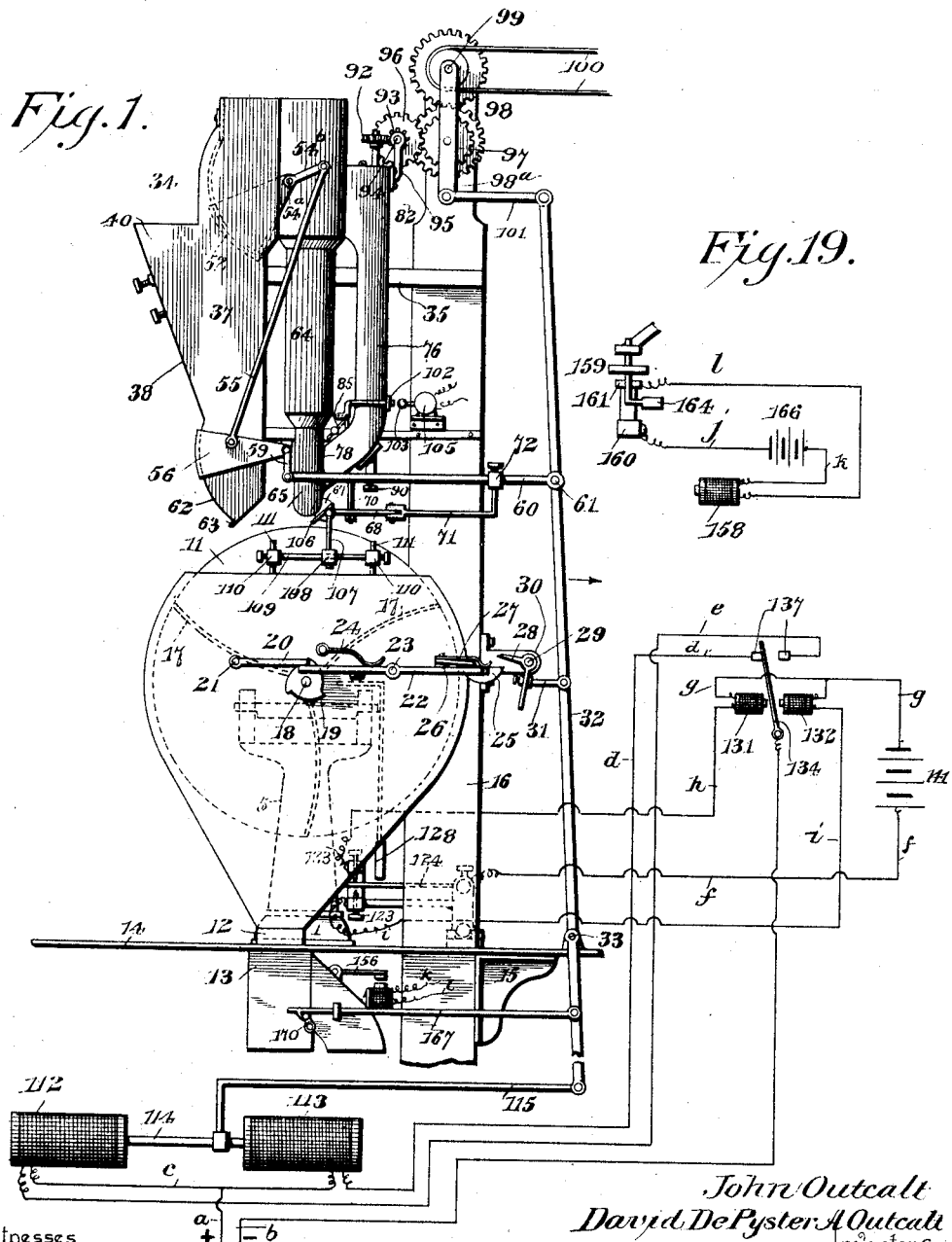
Witnesses
Jas. K. McCuthran
D. T. Hochhaupter
John Outcalt
David De Pyster A. Outcalt
Inventors
By their Attorneys.
C. A. Snow & Co.

No. 628,894. Patented July 11, 1899.
J. & D. DE P. A. OUTCALT.
WEIGHING MACHINE.
(Application filed June 6, 1898.)
(No Model.) 8 Sheets—Sheet 2.
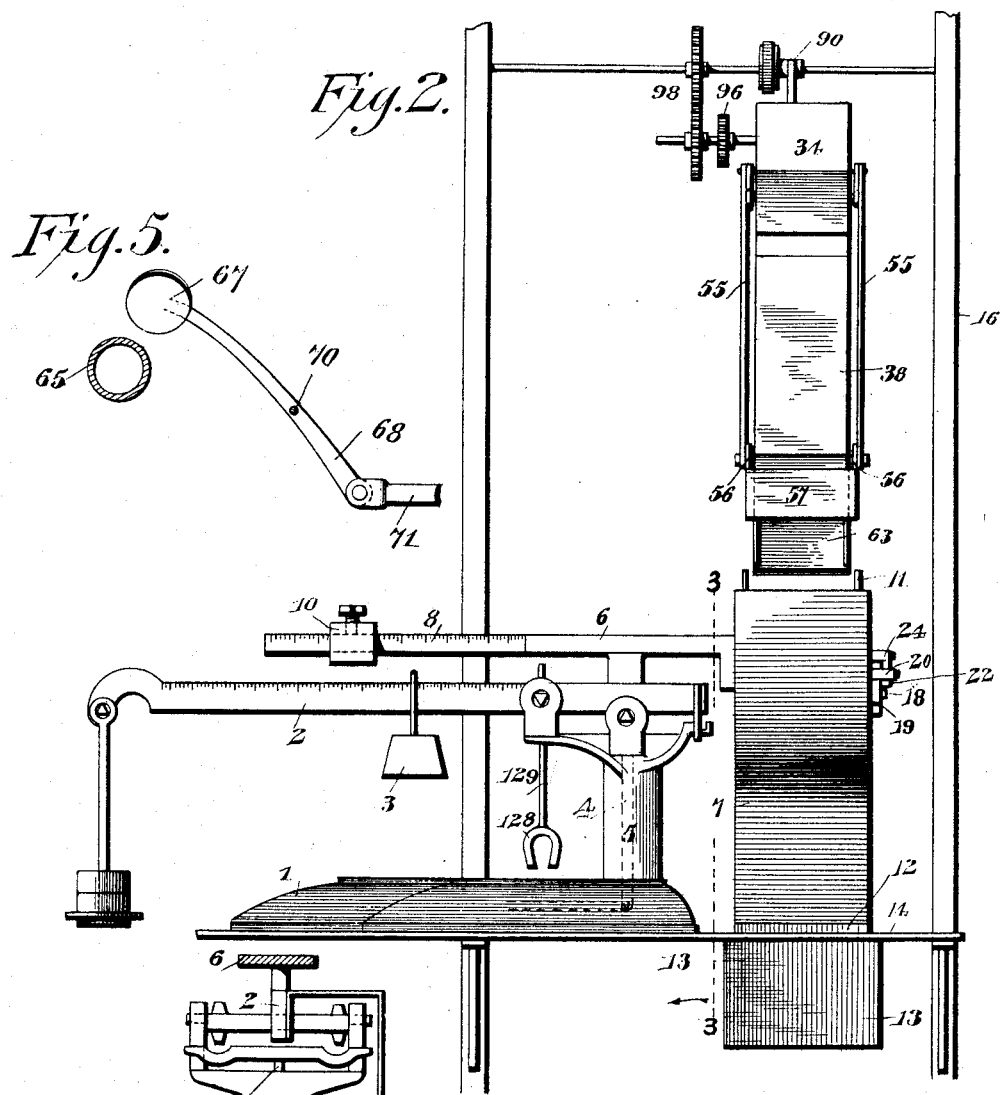
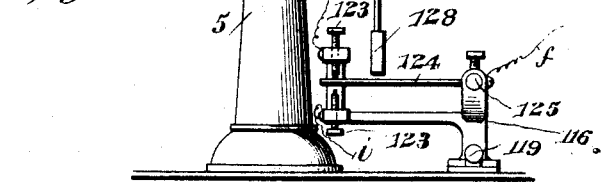
Witnesses
Jas. K. McCuthian
[signature]
John Outcalt
David DePyster A. Outcalt
Inventors
By their Attorneys.
C. A. Snow & Co.
THE NORRIS PETERS CO., PHOTO-LITHO., WASHINGTON, D. C.

No. 628,894. Patented July 11, 1899.
J. & D. DE P. A. OUTCALT.
WEIGHING MACHINE.
(Application filed June 6, 1898.)
(No Model.) 8 Sheets—Sheet 3.
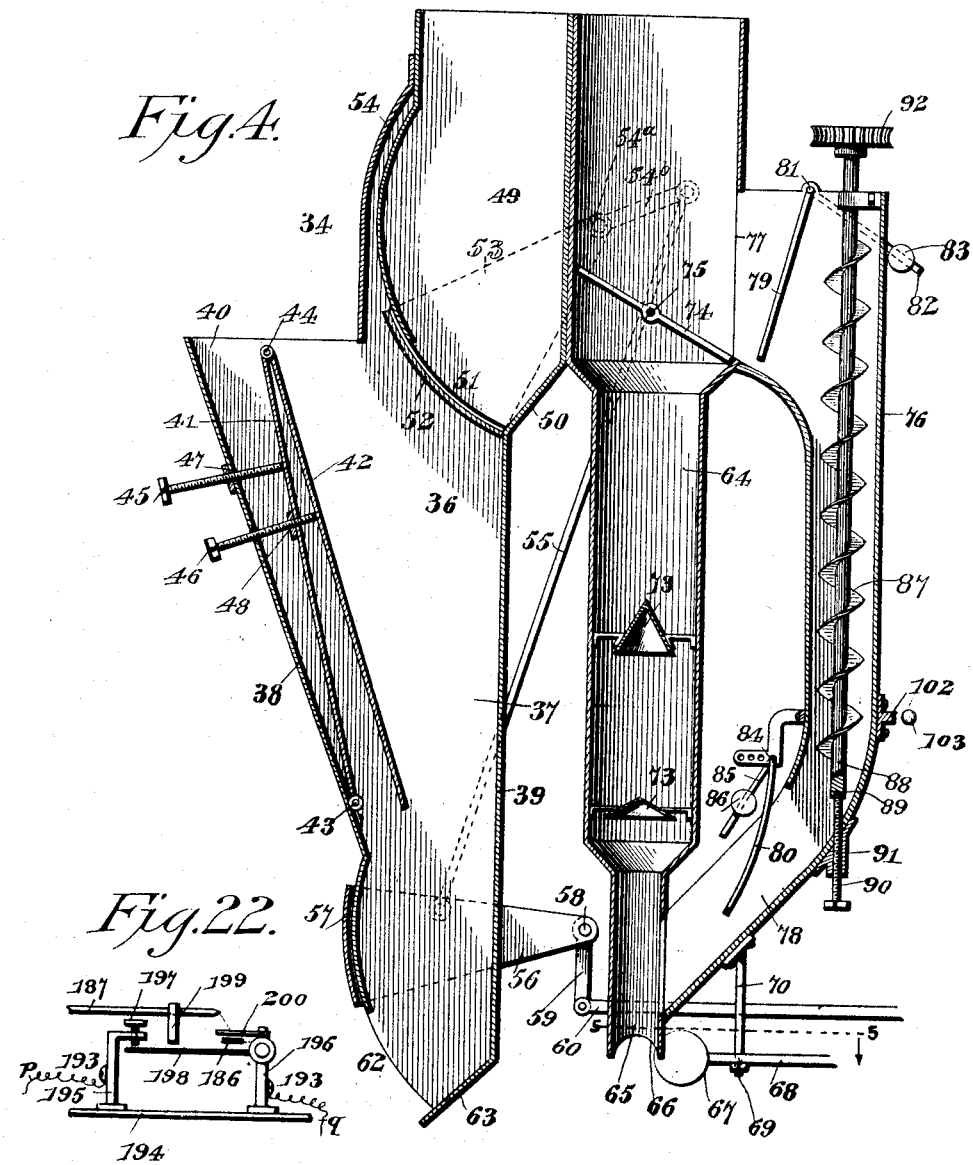
Witnesses
Jas. K. McLachran
D. T. Kothampler
John Outcalt
David De Pyster A. Outcalt
Inventors
By their Attorneys.
C. A. Snow & Co.

No. 628,894. Patented July 11, 1899.
J. & D. DE P. A. OUTCALT.
WEIGHING MACHINE.
(Application filed June 6, 1898.)
(No Model.) 8 Sheets—Sheet 4.
Fig. 6.
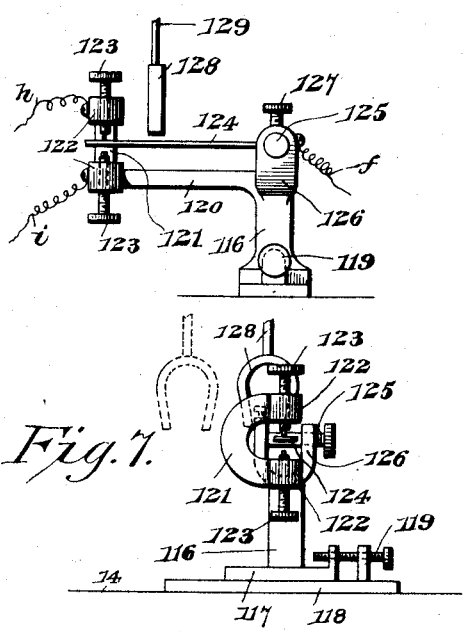
Fig. 7.
Fig. 8.
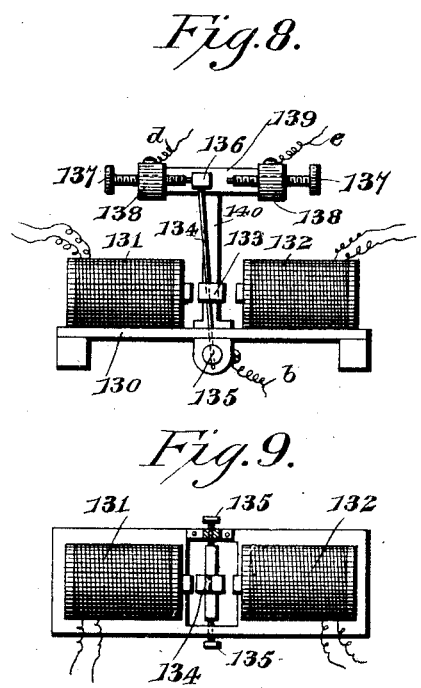
Fig. 9.
Fig. 10.
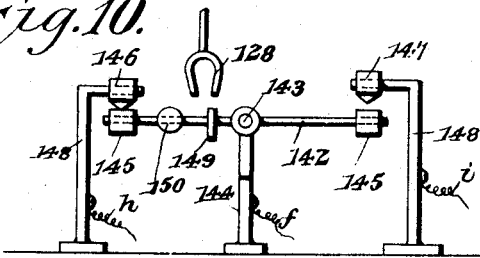
Fig. 11.
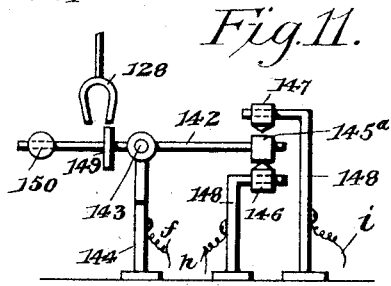
Fig. 12.
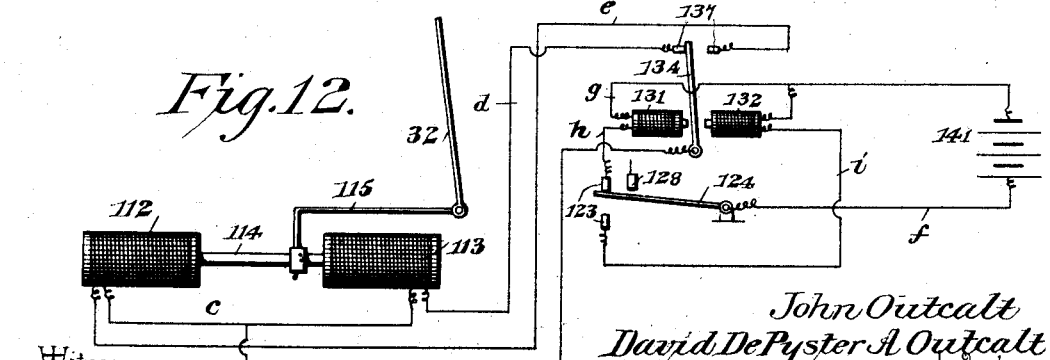
Witnesses
Jas. F. McLachran
D. P. Wolhaupter
John Outcalt
David DePyster A. Outcalt
Inventors
By their Attorneys.
C. A. Snow & Co.
THE NORRIS PETERS CO., PHOTO-LITHO., WASHINGTON, D. C.

No. 628,894. Patented July 11, 1899.
J. & D. DE P. A. OUTCALT.
WEIGHING MACHINE.
(Application filed June 6, 1898.)
(No Model.) 8 Sheets—Sheet 5.
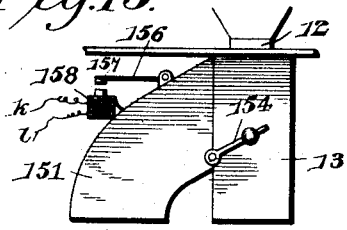
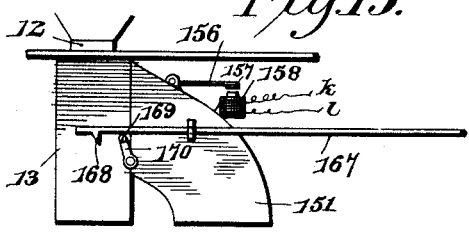
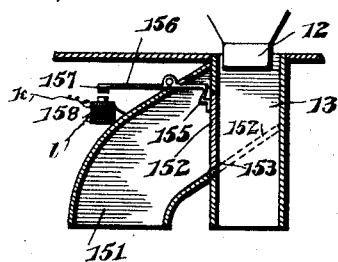
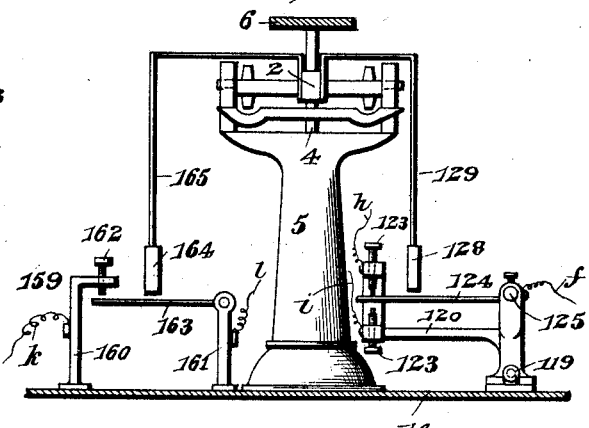
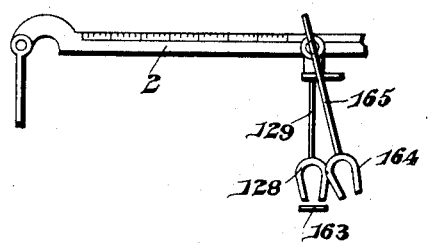
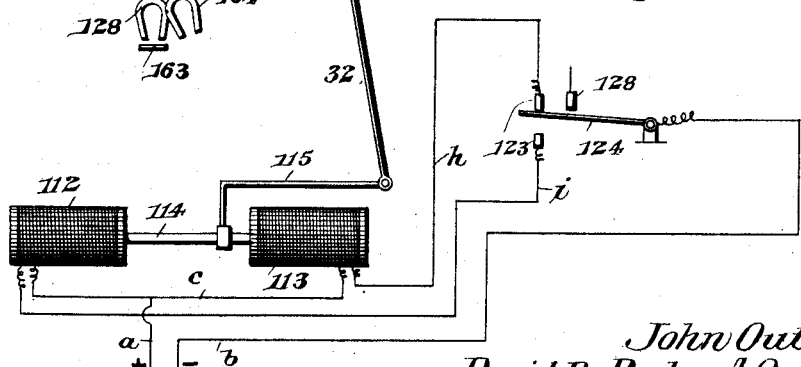
John Outcalt
David De Pyster A. Outcalt
Inventors No. 628,894. Patented July 11, 1899.
J. & D. DE P. A. OUTCALT.
WEIGHING MACHINE.
(Application filed June 6, 1898.)
(No Model.) 8 Sheets—Sheet 6.

Witnesses
Jas. K. M°Cathran
D. P. Holhaupter

John Outcalt
David De Pyster A. Outcalt
Inventors

By their Attorneys.
C. A. Snow & Co.

No. 628,894. Patented July 11, 1899.
J. & D. DE P. A. OUTCALT.
WEIGHING MACHINE.
(Application filed June 6, 1898.)

(No Model.) 8 Sheets—Sheet 7.

Witnesses
Jas. K. McCathran
D. P. Wolhaupter

By their Attorneys.
C. A. Snow & Co.

John Outcalt
David De Pyster A. Outcalt
Inventors

No. 628,894. Patented July 11, 1899.
J. & D. DE P. A. OUTCALT.
WEIGHING MACHINE.
(Application filed June 6, 1898.)

(No Model.) 8 Sheets—Sheet 8.

Witnesses
Jas. K. McCathran

John Outcalt
David De Pyster A. Outcalt
Inventors

By their Attorneys.
C. A. Snow & Co.

UNITED STATES PATENT OFFICE.

JOHN OUTCALT AND DAVID DE PYSTER ACKER OUTCALT, OF SPOTSWOOD, NEW JERSEY.

WEIGHING-MACHINE.

SPECIFICATION forming part of Letters Patent No. 628,894, dated July 11, 1899.

Application filed June 6, 1898. Serial No. 682,710. (No model.)

*To all whom it may concern:*

Be it known that we, JOHN OUTCALT and DAVID DE PYSTER ACKER OUTCALT, citizens of the United States, residing at Spotswood, in the county of Middlesex and State of New Jersey, have invented a new and useful Weighing-Machine, of which the following is a specification.

This invention relates to machines for automatically weighing and delivering various kinds of materials in predetermined amounts, and is especially designed for use in connection with weighing-machines of the type shown in our former patent, No. 511,647.

The present invention contemplates a machine operating somewhat on the principle of the machine covered by our pending application, Serial No. 609,091, and has primarily for its object the provision of suitable means for delivering to a suitable weighing-receptacle the bulk or main load of the material to be weighed, in combination with means for completing the amount to be weighed in a small stream. In this connection the invention also contemplates suitable provision for regulating the amount delivered in bulk, according to the variations in density of the various materials, and for regulating the speed of the feeding mechanism by providing for the acceleration or retarding of the flow of material.

A further object of the invention is to provide suitable means for accurately controlling the valves of the feeding mechanism through the medium of improved electrical controlling devices and also making provision for preventing the discharge of an overloaded bucket or receptacle into the package or receiver for the material being weighed.

A still further object of the invention is to improve the current-reversing mechanism for the controlling-solenoid disclosed in our pending application hereinbefore referred to, while also providing suitable means for locking or stopping the operation of the machine when the current supplied rises above or falls below certain prescribed limits or for locking or stopping the machine after a predetermined number of discharges or weighings have been made.

The several objects specified are attained by means of the improved mechanism hereinafter more fully described, illustrated, and claimed, and the preferred manner of adapting our several improvements for use in connection with automatically-operating weighing-machines is illustrated in the accompanying drawings, in which—

Figure 26:
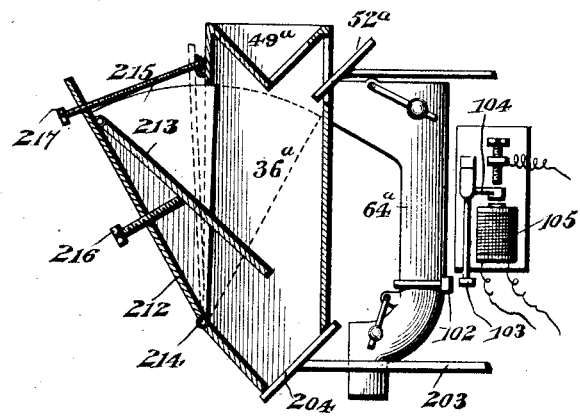
Figure 18:
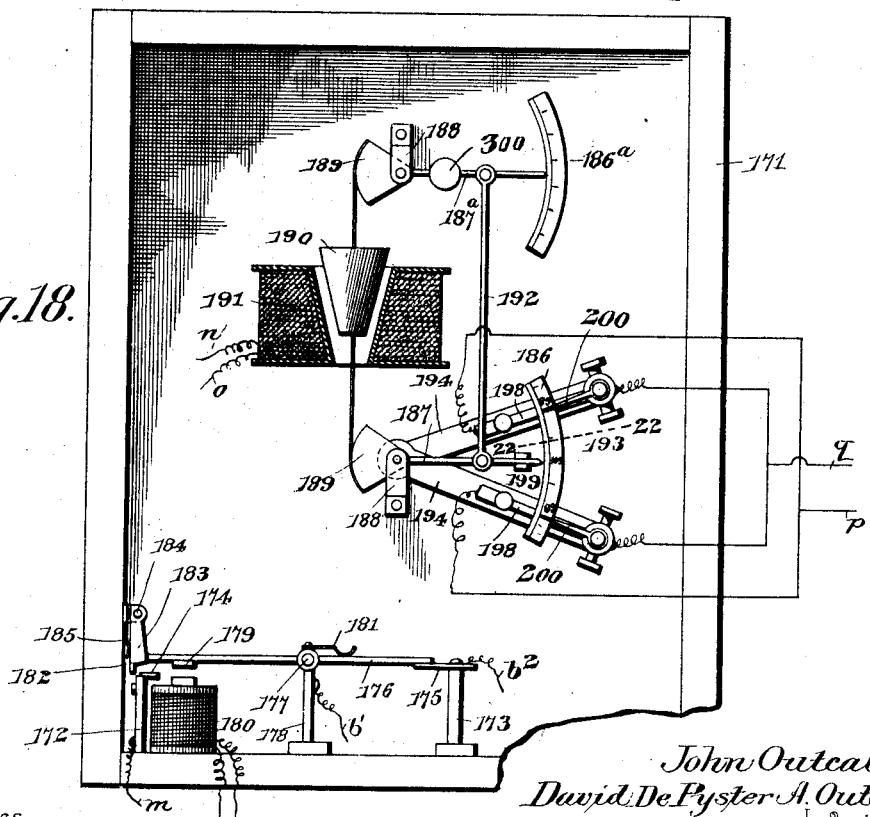
Figure 20:
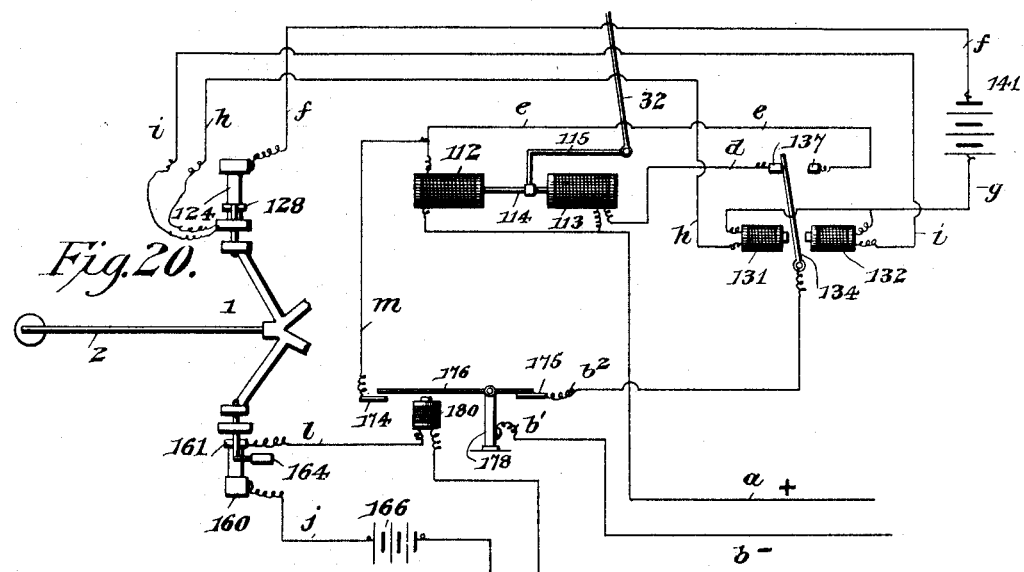
Figure 21:
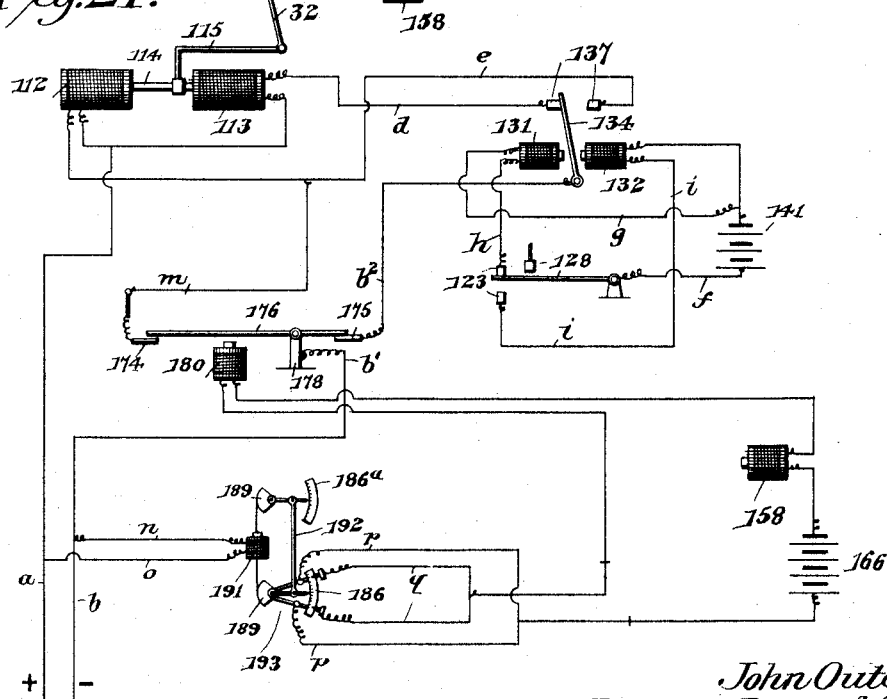
Figure 27:
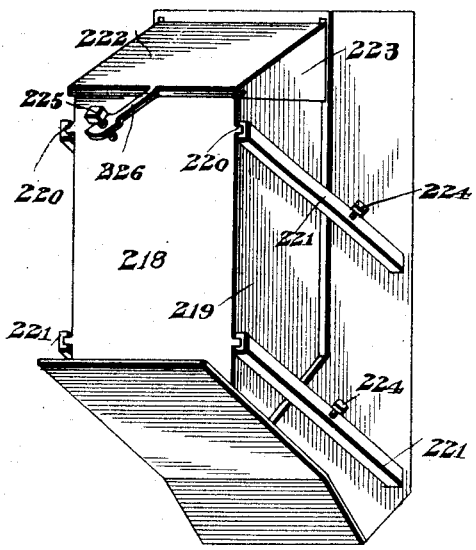
Figure 28:
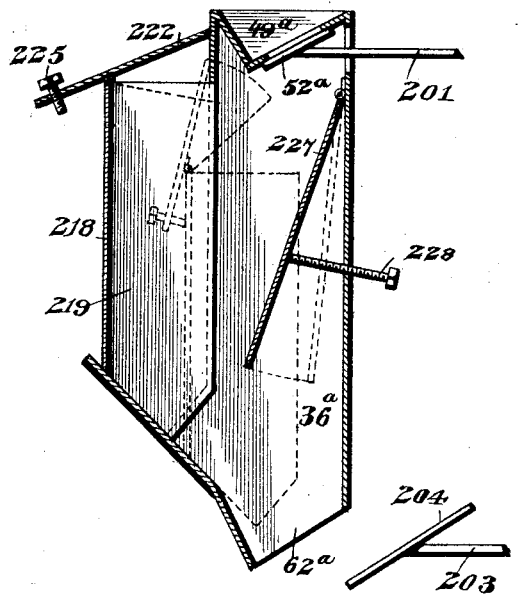
Figure 25:
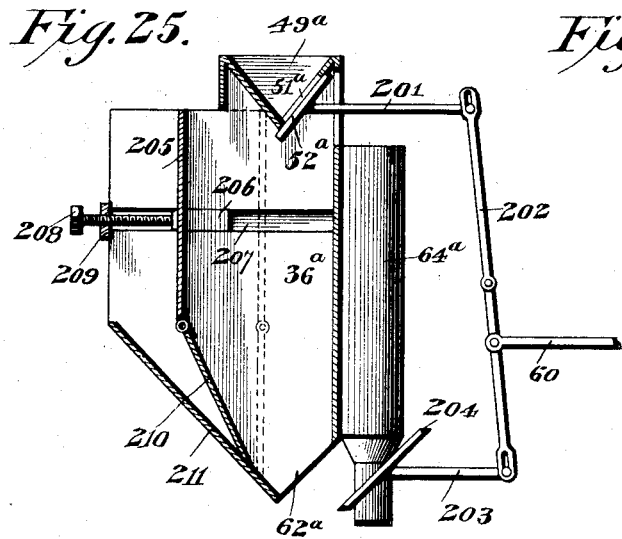
Figure 24:
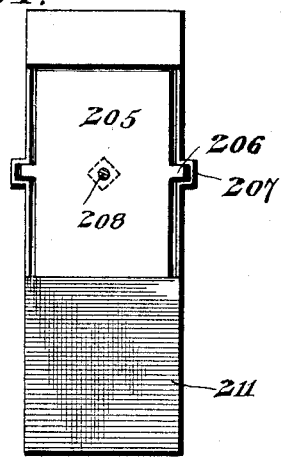

Figure 1 is a side elevation of a complete weighing-machine embodying the improvements contemplated by the present invention. Fig. 2 is a front view of the construction shown in Fig. 1. Fig. 3 is a detail sectional view on the line 3 3 of Fig. 2, showing the preferred manner of mounting the current-reversing circuit-closer in connection with the scales. Fig. 4 is an enlarged vertical sectional view of the automatic feeder or feeding mechanism. Fig. 5 is a detail sectional view on the line 5 5 of Fig. 4, showing the laterally-movable cut-off plate for the contracted discharge-neck at the lower end of the drip-chamber. Fig. 6 is an enlarged elevation of the current-reversing circuit-closer shown in Fig. 3. Fig. 7 is an end view of the circuit-closing instrument shown in Fig. 6 and illustrating in full and dotted lines different positions of the controlling-magnet carried by the axle of the scale-beam of the scales. Fig. 8 is a plan view of the current-reversing relay instrument used in connection with the circuit-closing device shown in Figs. 6 and 7 when the current employed is of high electromotive force. Fig. 9 is a plan view of the relay instrument shown in Fig. 8. Figs. 10 and 11 are detail elevations showing separate modifications of the current-reversing circuit-closer shown in Figs. 6 and 7. Fig. 12 is a diagrammatic view showing the circuit-wire connections with the controlling-solenoids for the controlling-lever of the feeding mechanism and with the circuit-closing and relay instruments when these instruments are employed by themselves. Figs. 13, 14, and 15 are enlarged detail elevations and sectional views of the overload-discharge attachment for the weighing-receptacle. Fig. 16 is a view similar to Fig. 3, showing the extra circuit-closing instrument required for use in connection with the overload-discharge attachment. Fig. 17 is a fragmentary view of the construction shown in Fig. 16, showing the relative disposition of the two controlling-magnets, one for the current-reversing circuit-closer and the other for the circuit-closer of the circuit for the overload-discharge attachment. Fig. 18 is an enlarged plan view of the current-controlling and cut-off instruments, respectively, for stopping the action of the machine when the current rises above or falls below a predetermined degree and for cutting out the circuit connections with the solenoid which opens the valves of the feeding mechanism until it is desired to again start the machine. Fig. 19 is a diagrammatic view showing the circuit connections when only a short local circuit is employed for energizing the releasing-magnet of the overload-discharge attachment. Fig. 20 is a diagrammatic view showing the circuit connections and the circuit cut-off or locking instrument which is used in connection with the current-reversing devices and the releasing-magnet for the overload-discharge attachment. Fig. 21 is a complete diagrammatic view showing the proper circuit connections when the potential-indicator or current-controlling device is interposed in the circuit and used in connection with the circuit cut-off or locking instrument, the current-reversing devices, and the releasing-magnet for the overload-discharge attachment. Fig. 22 is a detail sectional view on the line 22 22 of Fig. 18. Figs. 23, 24, and 25 are respectively a top plan view, front view, and vertical sectional view of a modified construction of feeder in connection with a single drip-stream chamber. Fig. 26 is a vertical sectional view, partly in elevation, of another modification of the feeder with a single drip-stream chamber. Figs. 27 and 28 are respectively a perspective view and a vertical sectional view of a modified form of feeder, showing modified means for varying the capacity of the bulk-chamber and omitting the use of a drip-chamber. Fig. 29 is a diagrammatic view showing the circuit-wire connections when the current-reversing circuit-closer is used alone in connection with the solenoids 112 and 113.

Referring to the accompanying drawings, the numeral 1 designates a scale of any approved type having the usual scale-beam 2, on which is arranged the sliding weight 3, adapted to be set to any desired point, according to the desired quantity of matter which is to be weighed by the weighing-receptacle used in connection with the scale. In the present invention the operating parts of the scales at the point of connection between the scale-beam and the usual check-rod 4, arranged within the tubular standard 5 of the scales and connected with the platform devices, are designed to support the weighing-receptacle bracket 6, to one end of which receptacle-bracket is suitably fastened the weighing receptacle or case 7. The other end of the bracket 6 has extended therefrom an auxiliary beam 8, lying above the main weighing-beam 7 of the scales and accommodating thereon a sliding counterbalance-weight 10, the object of which weight is to overcome the friction at the ends of the ordinary check-rod of the scales. It has been found that when a load or weight like that of the weighing receptacle or case 7, with the parts carried thereby, is supported at the outer edge or end of the bracket 6, the friction imposed upon the joints of the scale parts before referred to seriously affects the accuracy of the scales; but by counterbalancing the weight of the empty weighing-receptable and the parts carried thereby through the medium of the auxiliary beam 8 and the weight 10 thereon the friction is reduced sufficiently so as not to impair the accuracy of the scales.

The weighing receptacle or case 7 is illustrated as being of the same type as the weighing-receptacle disclosed in our former patent and pending application herein referred to, and it is of a circular shape, with an open upper side, so as to expose at the top thereof the revolving-compartment weighing-wheel 11, while the lower side of the weighing receptacle or case is contracted to form a bottom discharge-spout 12. This discharge-spout 12 at the lower side of the weighing receptacle or case 7 opens into a stationary discharge-spout 13, suitably fastened to a platform 14, supported by the brackets 15, fitted to an upright frame 16, which frame provides for supporting the working parts of the feeder or feeding mechanism independently of the weighing-receptacle, and it will be understood that the discharge-spout 13 provides for directing the weighed material into the package or receiver for the same. The revolving-compartment weighing-wheel 11 within the receptacle 7 is an ordinary construction, and essentially comprises a series of radially-extending and regularly-spaced curved buckets 17, traveling in close proximity to the rim of the receptacle and providing for holding the quantity of matter to be weighed at one side of the axis of the wheel, so that when the wheel is released and allowed to rotate the loaded compartment between a pair of buckets is relieved of its contents, which is discharged through the neck and spout 12 13.

The weighing-wheel 11 is mounted on a transverse axle journaled in diametrically opposite sides of the receptacle or case 7, and to provide for locking the said wheel against rotation and releasing the same at the proper time the wheel-axle 18 has secured fast on one end thereof, exterior to the weighing receptacle or case, a peripherally-notched stop-disk 19, the notches of said disk being adapted to be engaged by the free end of the gravity latch-arm 20, pivoted at its other end, as at 21, at one side of the weighing receptacle or case 7. Normally the latch-arm 20 engages with a notch of the disk 19 to prevent the wheel 11 from rotating while the exposed compartment at the top of the receptacle is being loaded, and to provide for the disengagement of the said latch-arm and stop-disk there is employed a release-lever 22, pivoted intermediate of its ends, as at 23, to the same side of the weighing receptacle or case as the said latch-arm. The said latch-arm and the releasing-lever 22 are sufficiently wide so as to project beyond the plane of the disk 19, and the inner end of the lever 22 normally rests lightly beneath the free end of the latch-arm 20, this light pressure of the releasing-lever being secured by means of a stop-spring 24, secured fast at one end to the receptacle 7 and having its free end bearing on the lever 22 near its pivot.

The outer end of the release-lever 22 projects slightly beyond the rim of the receptacle 7 and carries and has pivoted at one side of its projecting end a pivotal cam-plate 25, having a flat upper side and a round lower side, said cam-plate being of an approximate segmental shape. The inner end of said pivotal cam-plate 25 normally bears under and against a stop-plate 26, secured on top of the release-lever 22, near the outer end thereof, and at the same point the said lever 22 has secured thereto one end of a pressure-spring 27, the free end of which spring bears on the flat upper side of the cam-plate 25, beyond the pivot thereof, to provide for normally holding the inner end of the cam-plate against the stop-plate 26 and the outer end of the cam-plate in proper position to be engaged by the upper horizontally-disposed member of the bell-crank trip-lever 28. The bell-crank trip-lever 28 is pivotally supported at its angle, as at 29, on the hanger-bracket 30, fastened to the upright supporting-frame 16 for the feeding mechanism, and the lower pendent portion of said trip-lever has connected thereto one end of a short connecting-link 31, the other end of which link pivotally engages with the upright controlling-lever 32. This controlling-lever is conveniently supported intermediate its ends, as at 33, by the stationary platform 14 and is oscillated on its pivot through the medium of the electrically-controlled and automatically-operating mechanism to be hereinafter more particularly referred to, said lever also having connections for controlling the valves of the feeder or feeding mechanism used in connection with the weighing-receptacle.

As already explained, the latch-arm 20 normally engages with a notch of the stop-disk 19, and thereby locks the weighing-wheel 11 against rotation; but on the outward movement of the controlling-lever 32 in a direction away from the weighing-receptacle 7 the said lever, through the medium of the devices to be hereinafter described, cuts off the supply of material to the weighing-wheel 11 and simultaneously oscillates the trip-lever 28 in a direction which causes the upper horizontally-disposed member of said lever to engage against the outer projecting end of the cam-plate 25, thereby depressing the end of the release-lever 22 carrying the cam-plate and elevating the opposite or inner end. The elevation of the inner end of the release-lever 22 disengages the latch-arm 20 from the stop-disk 19, and thereby permits the weighing-wheel 11 to rotate within the receptacle and discharge its loaded compartment into the discharge-spout 13. In this movement of parts the engaging portion of the trip-lever 28 passes over the point of the cam-plate 25, thereby permitting the release-lever and the latch-arm to resume their normal position, and it will be observed that on the inward movement of the controlling-lever 32 toward the weighing-receptacle the horizontally-disposed member of the trip-lever 28 passes the projecting end of the cam-plate 25 by causing this plate to rock on its pivot against the pressure of the spring 27.

Arranged directly above the weighing-receptacle 7 in vertical alinement therewith is the feeder or feeding mechanism, which provides means for automatically delivering the load of material into the weighing-wheel within the weighing-receptacle, and while this feeder involves separated chambers or compartments the entire body of the same, including the different parts thereof, will be referred to under the general term of a "hopper-body," which is designated by the numeral 34. This hopper-body 34 has no contact with the weighing-receptacle or any part of the scales supporting the said receptacle and is held stationary in its operative position above the weighing-receptacle by means of suitable horizontal supporting-arms 35, fastened thereto and to the upright frame 16, as plainly illustrated in Fig. 1 of the drawings.

The hopper or hopper-body 34, with its several chambers and compartments, provides means for delivering to the weighing-receptacle dissimilar materials—such as bean and ground coffee, split peas, granulated sugar, and, in fact, any materials that can be handled in bulk and which it is desired to weigh in predetermined amounts. The principal form of the hopper or hopper-body is illustrated in Figs. 1, 2, and 4 of the drawings, and referring particularly to the sectional view of the hopper in Fig. 4 it will be observed that the said hopper is formed with the main upright bulk-chamber 36, which bulk-chamber is designed to hold the main load or bulk of the material to be weighed. The upright bulk-chamber 36 is entirely inclosed and confined within the side plates 37 and the front and rear walls 38 and 39, respectively, which are suitably joined together at their meeting edges; but the present invention contemplates means for varying the capacity or size of said chamber, and to provide for this the opposite side plates of the bulk-chamber are provided with front wing extensions 40, which are connected at their extreme outer edges by the inclined portion of the front wall 38, and inclose therebetween an extended space, within which are arranged for adjustment a pair of regulating-plates 41 and 42, respectively. The plates 41 and 42 are arranged substantially in an upright position, and the outermost of said plates 41 is hinged at its lower edge, as at 43, to the inclined portion of the front wall 38, connecting the wing extensions 40, while the innermost plate 42 is hinged at its upper edge, as at 44, to the upper edge of the plate 41, as plainly illustrated in Fig. 4 of the drawings. The two regulating-plates 41 and 42, which have a play within the front extension of the bulk-chamber 36, are designed to be adjusted independently of each other or in unison, and to make provision for these adjustments an adjusting-screw 45 is employed for use in connection with the plate 41 and an adjusting-screw 46 for use in connection with the plate 42. The adjusting-screw 45 is mounted in a threaded bearing 47, formed in the said inclined portion of the front wall 38, while the screw 46 is mounted in a similar bearing 48, formed in the outermost plate 41, so it will be observed that by adjusting the screw 45 both of the plates 41 and 42 swing in unison on the hinge 43, while the adjustment of the screw 46 simply provides for an independent adjustment of the innermost regulating-plate 42 toward or away from the rear wall 39 of the bulk-chamber, thereby providing for the contraction or enlargement of said chamber, according to the quantity of material to be weighed; but under all conditions the said bulk-chamber is designed to hold a quantity of the material to be weighed less than the amount desired, so that the loading of the weighing-receptacle can be completed by means of a small drip-stream, as will be hereinafter more particularly referred to.

The upright bulk-chamber 36 of the hopper-body is provided with a separate valved supply-compartment 49, which is open at its upper end to receive from a suitable source of supply the material to be weighed. The said supply-compartment 49 is partitioned off within the upper end of the bulk-chamber 36 and is provided at its lower end with an inclined bottom deflecting-plate 50 and with a bottom feed-opening 51, communicating with the bulk-chamber 36, to provide for the passage of the material in the compartment 49 into said bulk-chamber, and the said feed-opening 51 is designed to be covered and uncovered by a segmental swinging cut-off valve 52, which when in its lowered position rests against the lower edge of the bottom deflecting-plate 50 and is provided with the opposite wing-plates 53. The side wing-plates 53 of the upper segmental cut-off valve 52 for the supply-compartment loosely embrace the opposite sides of said compartment, and by reason of this compartment being partitioned off within the upper end of the bulk-chamber 36 an interior valve housing or space 54 is provided within the upper part of the bulk-chamber to receive the said upper cut-off valve when in its elevated or open position. The wing-plates 53 of the upper cut-off valve 52 are provided with short arm extensions $54^b$, which are pivoted, as at $54^a$, to opposite sides of the hopper-body, and these arm extensions $54^b$ have connected to their extremities the upper ends of the connecting-rods 55, arranged at opposite sides of the hopper-body and pivoted at their lower ends to the side wing plates or arms 56 of the lower segmental cut-off-valve plate 57, which connects the side wings 56 at one end thereof. The side wings 56 for the lower cut-off valve 57 loosely embrace opposite sides of the bulk-chamber 36 at the lower end thereof and are pivoted, as at 58, to suitable points of support at opposite sides of the hopper-body, and at its pivotal support the lower cut-off valve has rigidly connected therewith one end of a link bar 59, the other end of which bar is pivotally connected to one end of an adjusting-rod 60, the other end of which adjusting-rod is pivotally connected at 61 to the controlling-lever 32. By reason of the connections 60 and 59 between the controlling-lever 32 and the lower cut-off valve for the bulk-chamber it will be observed that the said lower cut-off valve will swing in unison with the upper cut-off valve 52; but by reason of connecting the rods 55 with the two valves, respectively, at opposite sides of their pivotal supports the lower cut-off valve will be opened simultaneously with the closing of the upper cut-off valve, and vice versa, so that the bulk-chamber will receive its supply of material from the supply-compartment 49 when the lower cut-off valve is closed and will have its supply of material cut off by the upper cut-off valve when the lower cut-off valve is open. Said lower cut-off valve 57 is arranged exterior to the bulk-chamber 36 and works over the lower curved portion of the front wall of said chamber and is designed to cover and uncover the bottom discharge-opening 62, formed in the lower end of the bulk-chamber in front of the inclined bottom deflecting-plate 63, which overhangs the weighing-wheel 11 of the weighing-receptacle and serves to properly deflect the bulk or main load of material from the bulk-chamber 36 into the exposed compartment of the weighing-wheel when the lower cut-off valve 57 is open.

While there is an interval in the motion of the valves 52 and 57 when the same will be partly open, still this does not in any way affect the accuracy of the mechanism, for the reason that at all times the bulk-chamber is designed to hold a quantity of material to be weighed less than the amount desired; also the motions of the two valves 52 and 57 are so timed and such valves are spaced apart a sufficient distance that the lower valve 57 will close quicker than any material (which may pass out of the compartment 49 when the valve 52 begins to open) could flow the distance between the two valves.

The hopper-body 34 is further provided with an independent drip-chamber 64, arranged at one side of the bulk-chamber 36 and separate therefrom, so as to hold an independent body of material which is delivered in a light drip-stream to the weighing-receptacle during the time the bulk of material is being discharged from the bulk-chamber into said receptacle. The independent drip-chamber 64 is also disposed in an upright position and is provided with an open upper end, which may or may not communicate with the supply-compartment 49 at the top of the bulk-chamber 36 and which is designed to receive therein the independent body of material which is to be fed in a drip-stream to the weighing-receptacle, and the said upright drip-chamber 64 is provided at its lower end with a contracted discharge-neck 65, lying in a vertical plane directly above the weighing-wheel 11 and having at its lower end an inclined valve-seat 66, against which is designed to work a circular laterally-movable cut-off plate 67, secured to one end of a horizontal oscillatory bowed or angled valve-lever 68, pivotally mounted intermediate of its ends, as at 69, on a fixed support 70 and having pivotally connected to its extremity opposite the valve-plate 67 a coupling or connecting arm 71, having an adjustable clamp connection 72 with the adjusting-rod 60 for the upper and lower cut-off valve for the bulk-chamber. The coupling or connecting arm connection 71 between the rod 60 and the lever 68 of the valve 67 provides means whereby said valve will operate in unison with the valves 52 and 57, and by reason of pivotally mounting the lever 68 at a point between its ends the inward movement of the controlling-lever 32 toward the weighing-receptacle will provide for simultaneously opening the lower cut-off valve 57 for the bulk-chamber and the valve 67 for the drip-chamber, while the reverse movement of the controlling-lever in an outward direction provides for the simultaneous closing of these valves.

By reason of operating the several cut-off valves in the manner described it will be observed that provision is made whereby the drip-stream is running to complete the load at the same time the bulk of material is dropped into the weighing-receptacle, and said drip-stream will also be cut off at the same time the outlet for the bulk-chamber is closed. Inasmuch as the bulk-chamber is adapted to hold a bulk of material less in amount than the required weight and which amount goes directly into the weighing-receptacle at the same time the drip-stream is running to complete the load, there is no weighing of the bulk load.

At suitable points within the drip-chamber 64 above the plane of the contracted discharge-neck 65 are suitably supported vertically-alined adjustable column-breaking cones 73, having their apices disposed in an upward direction and providing means for regulating or breaking the column of material, so that the same will feed off through the neck 55 in a light drip-stream, while at a suitable point within the chamber 64 above the plane of the cones 73 is mounted a pivotal cut-off plate 74. The pivotal cut-off plate 74 is carried by an adjusting-rod 75, extended through the sides of the chamber 64 and controlled manually or in any suitable manner to provide for cutting off the flow of material through the neck 65 when the secondary drip-chamber 76 is brought into play.

The secondary drip-chamber 76 is in the form of a tube and constitutes a portion of the complete hopper-body 34 at one side of the main upright drip-chamber 64, and said secondary drip-chamber is designed for use in connection with bean-coffee or similar material. The secondary drip-chamber 76 communicates at its upper end with the upper end of the main drip-chamber 64 through the feed-slot 77, formed in the partition-wall between the two drip-chambers at their upper ends, and said feed slot or opening provides means for permitting the supply of material to be deflected into the secondary drip-chamber 76 when the cut-off plate 74 is in its closed position and it is desired to subject the column of material formed in the drip-stream to the action of the regulating and retarding devices with which the secondary drip-chamber is equipped. The upper end of the chamber 76, which connects with the upper portion of the main drip-chamber 64, is preferably curved in a lateral direction, so that the weight of the column of material within the top portion of the secondary drip-chamber will be upon the upper bend or angle of said chamber, while the lower end of the chamber or tube 76 is curved inwardly in a lateral direction, as at 78, and is joined to the discharge-neck 65 of the chamber 64, so as to communicate with the interior of said neck and direct the secondary drip-stream through the neck into the weighing-wheel of the weighing-receptacle. It will therefore be observed that the valve 67 controls the discharge from either of the drip-chambers 64 or 76.

In connection with the use of the secondary drip-chamber 76 it is desirable to reduce the pressure of the column of the material in the drip-stream, so that the stream of material shall be as small and light as possible when leaving the valve-opening at the lower end of the discharge-neck 65, and to secure this result the upper and lower yielding baffle or resisting plates 79 and 80, respectively, are employed. The upper baffle or resisting plate 79 is preferably arranged within the upper bend of the chamber or tube 76 and swings from a rock-shaft 81, journaled in suitable bearings at opposite sides of the chamber or tube, and having connected therewith a weight-arm 82, carrying an adjustable weight 83, which provides for regulating the pressure of the plate 79 against the column of material, and by reason of having the weight of the column of material come upon the upper bend of the chamber or tube 76 the upper baffle or resisting plate 79 will act to better advantage and provide for gently resisting the tendency of the column of material to fall in bulk toward the lower discharging end of the chamber or tube. Both of the baffle or resisting plates 79 and 80 yield in an outward direction under the pressure of the column of material thereagainst, and the lower of said plates 80 projects at its free swinging edge into the lower discharging end portion 78 of the secondary drip chamber or tube. The said lower plate 80 is also suspended from a rock-shaft 84, journaled in suitable bearings at opposite sides of the chamber or tube, and having connected therewith a weight-arm 85, carrying an adjustable weight 86, which provides for regulating the pressure of the plate 80 against the column of material just before it passes into the discharge-neck 65 of the main drip-chamber 64.

Some grades of bean-coffee and other material will require means in addition to the plates 79 and 80 for properly retarding the material and breaking the same up into a light drip-stream, and to this end the secondary drip-chamber 76 is designed to receive therein a removable upright retarding worm or screw 87. The retarding worm or screw 87 is in the form of a conveyer-worm and extends the full length of the vertical portion of the chamber 76, and the lower spindle extremity 88 of said retarding worm or screw is provided with a bearing-socket 89, which receives the upper pointed end of the stepped bearing-screw 90, adjustably mounted in a threaded bearing 91 at the lower end of the chamber 76 and projecting into said chamber in vertical alinement with the vertical center thereof to provide for properly positioning the retarding worm or screw within the chamber, while at the same time permitting said worm or screw to be readily removed when the character of the material being weighed does not require its use. The upper spindle extremity of the retarding worm or screw 87 projects through the open upper end of the secondary drip chamber or tube 76, and has fitted thereto a worm-gear 92, meshing with an adjacent worm 93, carried by a short worm-shaft 94, journaled in a bearing-bracket 95, conveniently fastened to the hopper-body at the upper end of the secondary drip chamber or tube. The short worm-shaft 94 also carries a gear-wheel 96, which may be either a friction or cog gear-wheel and is designed to be intermittently engaged by one of the gears 97 of the train of gearing 98, mounted within a swinging or oscillatory gearing-frame 98ª, pivotally hung at its upper end, as at 99, at the top of the supporting-frame 16 for the feeder or feeding mechanism. One of the wheels within the gearing-frame at the pivoted end thereof forms a belt-pulley for receiving the driving-belt 100, and provides for transmitting motion to the entire train of gearing.

The lower swinging end of the gearing-frame 98 has pivotally connected thereto one end of a short connecting rod or link 101, the other end of which rod or link is pivotally connected to the upper end of the controlling-lever 32, so that the movement of this controlling-lever will simultaneously operate the valves of the feeder and the gearing-frame. The retarding worm or screw 87 when used in connection with the secondary chamber or tube 76 is only in motion when the discharging-valves 57 and 67 are open, so when said valves are closed by the outward movement of the controlling-lever 32 the gearing-frame 98 is swung in a direction which carries the gear 97 out of mesh with the gear-wheel 96, thereby simultaneously stopping the rotation of said retarding worm or screw with the closing of the valves 57 and 67.

The intermittently-revolving retarding worm or screw 87 is not intended as a force-feed for the column of material within the secondary drip chamber or tube; but its sole function is to provide means for properly retarding the flow of material and preventing undue acceleration thereof, so that it will discharge through the neck 65 in a small light stream.

While some grades of material will not require the use of the worm or screw 87, the same will require a slight jar or vibration to start the flow or to make the stream continuous, and to provide for this result the secondary drip chamber or tube 76 is provided at its outer side with a fixed or rigid jarring-lug 102, adapted to be engaged by a vibrating hammer 103, which hammer is preferably carried by the vibrating armature 104 of an electromagnet 105, included in a suitable push-button or equivalent circuit, which can be operated at any moment desired to provide for the necessary jarring or vibrating of the walls of the chamber or tube 76, whenever necessary, although it will be understood that the hammer 103 could be vibrated by equivalent mechanical means. It will of course be understood in connection with the operation of the hammer 103 that the same would be brought into play during the period that the discharging-valves of the feeder are open.

To insure the breaking up of the column of material delivered from the discharge-neck 65, so that the drip-stream will be very small and light, a separate inclined column-breaking plate 106 is arranged directly beneath and in close proximity to the discharge-opening of said neck 65. The lateral movement of the valve 67 permits the positioning of the plate 106 very close to the discharge-opening of the neck 65, and said plate is pivotally mounted between the horizontally-adjustable vertical supports 107, the lower ends of which supports have adjustable clamp-connections 108 with the vertically-adjustable horizontal bars 109, arranged at opposite sides of the weighing-wheel 11 and having adjustable clamp connections 110 at their upper ends with the short vertically-disposed supporting-posts 111, secured to the weighing receptacle or case at opposite sides thereof. The construction described provides means whereby the column-breaking plate 106 is capable of an axial, vertical, and horizontal adjustment, so that it can be properly positioned according to the character of the material being weighed. Such adjustment of the column-breaking plate is similar to the adjustment of the corresponding plate disclosed in our pending application hereinbefore referred to.

The movement of the controlling-lever 32 is accomplished automatically through the medium of the opposite alined solenoids 112 and 113, the solenoid 112 when energized providing for the movement of the lever 32 in a direction which causes the discharge-valves 57 and 67 to close, while the other solenoid 113 provides for the movement of the lever 32 in a direction which causes the said valves to open. The said alined solenoids 112 and 113 have a common reciprocatory core 114, which operates in the same manner as the solenoid 4, referred to in our pending application, Serial No. 609,091, and has coupled thereto between the solenoids or magnets 112 and 113 the adjusting-arm 115, which is pivotally connected to the lower end of the controlling-lever 32 below the pivotal support for this lever.

The electric current is supplied to the solenoids 112 and 113 from a dynamo or other suitable source of electrical energy through the main conductors $a$ and $b$, the main conductor $a$ having a common wire connection $c$ with one terminal of each solenoid, while the other conductor $b$ is included in a circuit with the instrument employed for the purpose of reversing the direction of the current, so as to alternately energize the two solenoids. In connection with the instrument for reversing or shifting the current from one solenoid to the other there is employed a current-reversing circuit-closer. (Illustrated in Figs. 3, 6, and 7 of the drawings.) This instrument or device is preferably arranged directly at one side of the scales, as plainly shown in Fig. 3 of the drawings, and essentially comprises a supporting-standard 116, having a foot-plate 117 adjustably mounted on a stationary base 118, which is placed on the same support which holds the scales 1. The foot-plate 117 of the standard 116 slidably rests on the base 118 and is adjusted to a proper position through the medium of the adjusting-screw connection 119 between the foot-plate and base, and the said support-standard 116 of the circuit-closing instrument or device is provided with a horizontal arm 120, carrying at one end a vertically-disposed yoke 121, having at its extremities the screw-collars 122, in which are adjustably fitted the contact-screws 123, whose inner pointed ends are normally spaced apart to provide for the play of one end of the movable contact-arm 124. The movable contact-arm 124 is preferably made of a flat strip or ribbon of steel and is designed to have the free end thereof work between the points of the contact-screws 123, so as to alternately contact with such screws, and at its end opposite the screws 123 the movable metallic contact-arm 124 is secured to a supporting-spindle 125, mounted in suitable bearings 126 at the upper end of the standard 116 and held in its adjusted position by means of the set-screw 127. The manner of supporting the metallic contact-arm 124 provides means whereby the same can be set to normally rest against the lower contact-screw 123, and the automatic elevation of the said contact-arm 124 against the upper contact-screw 123 is provided for through the medium of the swinging magnet 128, preferably of the horseshoe type. The magnet 128 is suspended from the lower end of a supporting-rod 129, the upper end of which supporting-rod is preferably connected to the axle of the main scale-beam 2, as plainly illustrated in Fig. 3 of the drawings, so that the movement of the magnet 128 will be coincident or coextensive with that of the scale-beam and in unison therewith. By reason of the adjustable support of the circuit-closing instrument or device just described it will be understood that the proper relative adjustment of the contact-arm 124 and the magnet 128 may be secured to suit different weighings.

The circuit-closing instrument or device, which operates in conjunction with the swinging magnet 128, may be employed alone in connection with the solenoids 112 113 when the current supplied through the conductors $a$ and $b$ is of low electromotive force; but the instrument referred to is preferably used in connection with the current-reversing relay illustrated in Figs. 8 and 9 of the drawings, as the interposition of this relay instrument in the circuit prevents a current of high electromotive force from affecting the accuracy of the weighing. The current-reversing relay instrument may be conveniently secured to a shelf or at any other desirable point either remote from or near to the circuit-closing instrument or device. The relay instrument shown in Figs. 8 and 9 is provided with a base 130, which is secured to the shelf or other support for the instrument and which base supports thereon a pair of spaced magnets 131 132, with their adjacent core ends in longitudinal alinement to provide for the attraction and repulsion of the armature-keeper 133, fitted to the swinging armature 134, which is arranged to play between the two magnets. The armature 134 is loosely pivoted at one end between the oppositely-located bearing-screws 135, fitted in suitable supports at opposite sides of the base 130, and the free end of the armature is provided with a contact 136, designed to play between the inner points of the oppositely-located alined contact-screws 137, adjustably mounted in the screw-collars 138, arranged at opposite ends of a cross-head 139, carried at one end of a supporting-arm 140, fastened to the base 130 and projecting beyond the same.

Referring to the circuit-wire connections between the solenoids and the circuit-closing and relay instruments, it will be observed that the solenoid terminals and conductors $a$ and $b$ are in direct circuit with the relay instrument, while a local circuit is employed in connection with the circuit instrument or device for reversing the current from the magnet 131 to the magnet 132, and vice versa. One of the screw-collars 138 of the relay instrument has a direct wire connection $d$ with one terminal of the solenoid 113, while the other screw-collar 138 has a direct wire connection $c$ with one terminal of the solenoid 112, while the negative conductor $b$ is connected with the pivotal support of the armature 134 so as to be in direct connection with this armature, thus completing the wiring for the solenoids.

The wiring for the local circuit of the magnets 131 and 132 and the circuit-closing instrument or device is as follows: The movable contact-arm 124 has a metallic connection with one terminal of a battery-wire $f$, which connects with one pole of an electric battery 141 or other source of electrical energy, while the other pole of said battery has connected therewith the battery-wire $g$, having a common wire connection with one terminal of each of the magnets 131 and 132, the other terminal of the magnet 131 having a wire connection $h$ with the upper contact-screw 123 and the other terminal of the magnet 132 having a wire connection $i$ with the lower contact-screw 123 of the circuit-closing instrument or device.

With the parts assembled and wired in the manner described the automatic operation of the machine will be readily understood.

In the initial operation of the machine, with the scale-beam at rest, it will be assumed that the magnet 128 is lying directly above the metallic contact-arm 124, and by its attraction for such arm will hold the latter in contact with the upper contact-screw 123, which position of parts causes the local circuit of the relay instrument to traverse the wire $h$, magnet 131, wire $g$, battery 141, wire $f$, and movable contact-arm 124. (See diagrammatic Fig. 12.) With the local circuit completed through the magnet 131 the magnetization of the latter will cause an attraction of the armature 134 in a direction to bring said armature against the contact-screw 137, having the wire connection $d$ therewith, thereby closing a solenoid-circuit through the wire $b$, armature 134, wire $d$, solenoid 113, and conductor or wire $a$. The completion of this circuit energizes the solenoid 113 and causes a movement of the controlling-lever 32 in a direction for opening the discharge-valves 57 and 67 of the feeder, so as to permit the weighing-receptacle to take in its load. As previously explained, the contents of the bulk-chamber 36 will be discharged into the weighing-receptacle before the poising period of the scales commences, while the load is completed by the drip-stream from the discharge-neck 65. When the poising period arrives, or, in other words, when the scale-beam comes to the balance-point, the magnet 128 will have passed to a position beyond the zone of influence for the arm 124, so that the latter will drop in contact with the lower contact-screw 123. The local circuit for the relay will then be completed through the wire $i$, the magnet 132, wire $g$, battery 141, wire $f$, and arm 124, thus energizing the magnet 132 and causing a movement of the armature 134 against the contact-screw 137, having the wire connection $e$ therewith. A solenoid-circuit will then be closed through the wire $b$, armature 134, wire $e$, solenoid 112, and conductor or wire $a$. The energization of the solenoid 112 will cause a movement of the controlling-lever 32 in a direction for simultaneously closing the discharge-valves 57 and 67, for opening the valve 52, for stopping the action of the gearing 98 in case the retarding worm or screw is used in conjunction therewith, and also releasing the weighing-wheel.

As already explained, when the current used to operate the solenoids 112 and 113 has a low electromotive force the circuit-closing instrument shown in Figs. 6 and 7 or in the modifications of Figs. 10 and 11 may be used alone, and in such case the negative conductor $b$ is connected with the arm 124, while the wires $h$ and $i$ for the contact-screws 123 are respectively connected with the terminals of the solenoids 112 and 113, opposite the terminals having the wire connections $c$ therewith. (See Fig. 29.) These simple circuit-wire connections provide means whereby the circuit-closing instrument described in its operation will reverse or shift the current from one solenoid to the other. However, it is quite necessary to use the relay instrument when the current has a high electromotive force, as it has been found that the arc formed by breaking the contact between the contact-screws draws or holds back the beam or scale mechanism so as to materially affect the accuracy of the weighing. This is obviated by introducing the relay instrument, which permits the use of a current of higher electromotive force for the solenoids and confines the current of low electromotive force to the local circuit for operating the magnets 131 and 132.

While the form of circuit-closing instrument or device as shown in Figs. 3, 6, and 7 is preferably employed, the modifications of Figs. 10 and 11 may be substituted therefor. In the modifications shown in Fig. 10 the movable contact-arm 142 is pivotally supported intermediate of its ends, as at 143, on the upper end of a supporting-post 144, and is provided at its opposite end with the contact-blocks 145, adapted to respectively contact with the oppositely-located fixed contacts 146 and 147, mounted on the oppositely-located standards 148, the standard 148 for the contact 146 having the circuit-wire $h$ connected therewith and the standard for the contact 147 having the circuit-wire $i$ connected therewith, while the battery-wire $f$ is connected with the support for the movable contact-arm 142. This contact-arm is provided at one side of its pivot with a keeper 149, which comes under the influence of the magnet 128, and with a weight 150, which provides for normally moving one of the contacts 145 against the contact 147.

In the modification of the circuit-closing instrument shown in Fig. 11 of the drawings the same construction is employed as in the form of instrument shown in Fig. 10, the only difference between these two modifications being that the standards 148 are of different lengths and are arranged in close relation, so as to dispose the contacts 146 and 147 directly opposite each other with a space therebetween for the play of the single contact-block $145^a$ at one end of the movable contact-arm 142, the weight 150 in both of the modifications serving to normally close the circuit through the contacts 147. It will be seen that the same relation of contacts is preserved in the modifications of Figs. 10 and 11 as in the preferred form of circuit-closing instrument previously described, so the manner in which the local circuit for the relay instrument is controlled is necessarily the same in all forms of the circuit-closing instrument.

The presence of foreign substances in the material being weighed frequently results in the overloading of the weighing-receptacle, and in order to prevent the discharge of an overloaded receptacle into the package or receiver placed beneath the discharge-spout 13 the latter is provided with a lateral overload-discharge extension 151, through which the overloaded contents of the weighing-receptacle are designed to be deflected without passing into the package or receiver beneath the spout 13. At the point of communication between the spout 13 and its extension 151 is arranged a deflecting-gate 152, hinged at its lower edge, as at 153, at the lower side of the opening between the spout and the extension thereof, and one of the hinge extremities of the gate 152 has fitted thereto a weighted arm 154, which provides for throwing the gate 152 across the spout 13 when the gate is released. To provide for normally locking the gate 152 in its closed position within the opening between the spout and its extension, the said gate is provided at one side with a keeper 155, which is engaged by the inner catch end of a pivotal latch-arm 156. The latch-arm 156 is pivoted intermediate of its ends to the spout extension 151 and is provided at its outer end with a keeper 157, arranged adjacent to the core of a release-magnet 158, included in a circuit with the circuit-closer 159, the arrangement of said circuit-closer in connection with the scales being shown in Fig. 16 of the drawings. The circuit-closer 159 essentially comprises a pair of supporting-posts 160 and 161, the supporting-post 160 carrying a contact-screw 162, and the supporting-post 161 having fitted thereto one end of the steel spring-contact arm 163, the free end of which arm is normally out of contact with the screw 162, said contact-arm being adapted to be influenced by a controlling-magnet 164. The controlling-magnet 164 is preferably of the horseshoe type and is suspended at the lower end of a rod 165, the upper end of which rod is preferably connected with the axle of the scale-beam 2 in the same manner as the supporting-rod 129 for the magnet 128.

The controlling-magnet 164 is arranged at an angle with relation to the controlling-magnet 128 for the current-reversing circuit-closer, as shown in Fig. 17, so that it will not come within the zone of influence for the contact-arm 163 unless the scale-beam rises above its balance-point under the influence of an overloaded bucket within the weighing-receptacle. When this occurs, the magnet 164 will have passed to a position over the arm 163, thereby moving said arm against the contact-screw 162, so as to automatically close the circuit through the release-magnet 158. When this release-magnet is operated independently of any other instrument, a simple local circuit is employed therefor, as shown in diagrammatic Fig. 19. In this circuit a battery-wire $j$ leads from one pole of a battery 166 to a supporting-post 160 for the contact-screw 162, while the wire $k$, connected to the other pole of the battery, leads to one of the terminals of the release-magnet 158, the other terminal of which magnet has a wire connection $l$ with the supporting-post 161 for the contact-arm 163.

When the release-magnet 158 is energized, the armature latch-arm is attracted toward the magnet, thereby releasing the inner catch end of said arm from the keeper 155. Thus released the weighted arm 154 swings the gate 152 across the spout 13, thereby deflecting the discharge from the overloaded bucket of the weighing-receptacle through the lateral overload-discharge extension 151 of the discharge-spout. The automatic resetting of the deflecting-gate 152 occurs when the controlling-lever 32 moves in a direction to open the discharge-valves 57 and 67 of the feeder or feeding mechanism, and to secure this result a resetting-rod 167 is employed. This resetting-arm is pivotally connected at one end to the controlling-lever 32 below its pivot, and near its opposite end the said rod 167 is provided at its lower side with a shoulder 168, adapted to engage against the pin 169, fitted in the upper end of a rock-arm 170, secured fast at its lower end to one of the hinge extremities of the gate 152. As the lower portion of the lever 32, below its pivot 33, moves in an outward direction away from the overload-discharge attachment, the engagement of the resetting-rod 167 with the rock-arm 170 will provide for throwing the gate 152 back within the opening between the spout 13 and its extension 151, which movement of the gate 152 causes the keeper 155 thereof to automatically engage with the inner catch end of the latch-arm 156.

The overload-discharge attachment just described, which provides means for deflecting the overload through a separate channel or spout than that for correct weighings, is especially valuable in cases where sticks, straws, and the like clog or catch in the valves, and thereby produce overweights, which ordinarily would continue to discharge through the common discharge-spout into the package or receiver, and in connection with the overload-discharge attachment referred to, it is desirable to include in the local circuit for the release-magnet of the overload-discharge attachment a circuit-cut-off instrument which shall provide means for cutting out the circuit connections with the solenoid, which opens the valves of the feeder, and thereby locking the machine or at least stopping the operation thereof until the parts have been readjusted. This circuit cut-off or stop instrument is illustrated in Fig. 18 of the drawings and is preferably mounted within the same case or box 171 which houses the current-controlling device or potential-indicator, which will be hereinafter particularly referred to. The case or box 171, containing the instruments referred to, may be placed on a shelf or any other convenient support, and the said circuit cut-off or stop instrument essentially comprises a pair of contact-posts 172 and 173, spaced a distance apart and having respectively fitted to one end thereof the contact-plates 174 and 175, which contact-plates are adapted to be respectively engaged by the opposite ends of the pivotal armature contact-arm 176. The pivotal armature contact-arm 176 is pivotally mounted intermediate of its ends, as at 177, on a supporting-post 178, arranged intermediate the contact-posts 172 and 173, and is provided near one end with a keeper 179, located adjacent to the core of an electrocontrolling-magnet 180. The end of the armature contact-arm 176 opposite the magnet 180 is normally held in contact with the plate 175 by means of the pressure-spring 181, secured fast at one end to the pivotal support of the armature 176 and bearing at its free end on the armature, and the end of said armature-arm which is normally out of contact with the plate 174 is adapted to be engaged by the shouldered end 182 of a spring-actuated catch-arm 183. This catch-arm 183 is pivoted at one end to a fixed point of support, as at 184, and has arranged at one side thereof a spring 185, whose tension normally presses said catch-arm against the adjacent end of the armature 176; but normally the end of the armature next to the catch-arm 183 lies at one side of the shoulder 182, and therefore out of engagement therewith.

The diagram of the circuit for the circuit cut-off or stop instrument just described is shown in diagrammatic Fig. 20 of the drawings, and by reference to this figure of the drawings it will be observed that the negative conductor $b$ has in addition to its connection with the armature 134 separate terminal connections $b'$ and $b^2$, respectively, with the pivotal support for the armature 176 and with the contact-plate 175, while the opposite contact-plate 174 has a wire connection $m$ with the wire $e$, which is connected with one of the terminals of the solenoid 112. The electrocontrolling-magnet 180 for the armature 176 has its terminals included in series with the circuit-wire $l$ of the local circuit for the release-magnet 158 of the overload-discharge attachment. It will be observed that the separate local circuits for the current reversing or shifting instruments used in connection with the solenoids 112 and 113 operate entirely independent of the circuit-wire connections with the overload-discharge attachment and with the circuit cut-off or stop instrument, the operation being the same as described in connection with diagrammatic Fig. 12; but when the magnet 164 comes into play and raises the contact-arm 163 against the contact-screw 162 a circuit will be simultaneously closed through the release-magnet 158 for the overload-discharge attachment and through the controlling-magnet 180 for the armature 176 of the circuit-cut-off instrument. Therefore at the moment the deflecting-gate 152 is dropped in the manner previously explained one end of the armature 176 will be drawn against the contact-plate 174 and the shouldered end of the catch-arm 183 will spring into engagement of such end of the armature 176 and lock the same in contact with the plate 174. With the parts thus positioned the current passes through the negative conductor $b$, the connection $b'$ with the armature 176, the contact 174, the wire connection $m$, the wire $e$, the solenoid 112, and the positive conductor $a$, thereby cutting out the circuit from the solenoid 113, and keeping the solenoid 112 energized, so that the discharge-valves of the feeder will be held locked in their closed positions until the catch 183 is released from the armature 176 and the circuit restored to its usual channel through the wire $b$, its terminal connections $b'$ and $b^2$, and the armature 134 of the current-reversing relay.

In the operation of the herein-described machine we have found that a variation beyond certain limits in the current supplied to the machine materially affects the accuracy of the weighings, so in order to provide means for automatically stopping the operation of the machine when the current rises above or falls below a predetermined degree the current-controlling device or potential-indicator illustrated in Fig. 18 of the drawings is employed. The current-controlling instrument embodies improvements that are especially adapted for use in connection with the type of voltmeter or potential-indicator illustrated in Fig. 18 of the drawings, which instrument embodies a pair of duplicate segmental dials 186 and 186ª and a pair of swinging index-arms 187 and 187ª, respectively, for each of the dials, said dials being divided to read volts or parts of a volt and both having the same readings thereon, and while the duplication of the dials and index-arms is not absolutely necessary still it is desirable in order that the adjustable circuit-closers may be used in connection with only one of the dials and index-arms, thereby leaving the other dial and index-arm fully exposed for the reading. The oppositely-located index-arms 187 and 187ª are pivotally mounted in suitable brackets 188, secured to the base of the case or box 171, and the segmental heel ends 189 of the index-arms are connected to a common solenoid-core 190, which is controlled in its movements by the solenoid 191, having separate wire connections $n$ and $o$, respectively, with the main conductors $a$ and $b$, so that fluctuations in the strength of the current passing through the said conductors will affect the solenoid and cause a movement of the index-arms over the dials to indicate the readings. The index-arm 187ª carries at one side of its pivotal support a counterbalance-weight 300, which serves to restore the mechanism to its initial or no-current position.

The index-arms 187 and 187ª are connected for movement in unison by the connecting-rod 192, and for the purpose of carrying out the present invention there is employed in connection with the dial 186 and the index-arm 187 a pair of adjustable circuit-closers 193. (Illustrated in detail in Fig. 22 of the drawings.) Each of the adjustable circuit-closers 193 is provided with a movable base 194, pivotally connected at one end with the axis of the index-arm 187, so as to be capable of an axial or swinging adjustment, and arising from said adjustable base 194 is a pair of oppositely-located supporting-posts 195 and 196, the supporting-post 195 carrying a contact-screw 197 and the supporting-post 196 carrying a movable contact-arm 198, whose free end is normally out of contact with the screw 197 and is adapted to be elevated against said contact or contact-screw 197 by means of the permanent magnet 199, fitted to the index-arm 187. Each of the adjustable circuit-closing devices is further provided at one end of the supporting-post 196 with a pointer-finger 200, which lies above the contact-arm 198 and overhangs the segmental dial or dial-plate 186.

The supporting-posts 195, carrying the contact-screws 197 of both of the adjustable circuit-closers, have a common circuit-wire connection $p$ therewith, while the supporting-posts 196, carrying the contact-arms 198 of said circuit-closers, have a common circuit-wire connection $q$ therewith, and these circuit-wire connections are connected in series with the magnets 158 and 180, as plainly illustrated in diagrammatic Fig. 21 of the drawings. These circuit connections between the current-controlling instrument and the magnets 158 and 180 are entirely independent of the circuit-wire connections between these magnets and the circuit-closer 159, which is brought into action by an overload in the weighing-receptacle. It will thus be seen that the magnets 158 and 180, as well as the battery 166, have independent wire connections with the circuit-closer 159, as well as with the current-controlling instrument or potential-indicator.

Assuming that it is desired to limit the variation in potential between ninety and one hundred and nine volts, one of the adjustable circuit-closers 193 is adjusted to a position so that its pointer 200 indicates "89 volts" on the dial or dial-plate 186, while the other instrument of the pair is adjusted to a position to bring its pointer to indicate "110 volts" on the same dial or dial-plate. If the current falls below ninety volts or rises above one hundred and nine volts, the permanent magnet 199 on the index-arm 187 will lift the contact-arm 198 of the circuit-closing instrument over which it passes against the contact-screw 197, thereby closing a local circuit through the release-magnet 158, the battery 166, and the magnet 180, and the completion of this circuit causes the said release-magnet and controlling-magnet 180 to operate in the manner previously described, the energization of the magnet 180 causing the armature 176 to move to a position which cuts out the current to the solenoid 113 and the current-reversing instrument and maintains the circuit through the solenoid 112, which keeps the discharge-valves of the feeder closed until the catch-arm 183 is released from the armature 176 and the current is restored through the usual circuit.

As already explained, the magnets 158 and 180 have independent wire connections with the circuit-closer 159, set into action by an overload, as well as independent wire connections with the current-controlling instrument or potential-indicator; but it should be explained at this point that the essential purpose of the current-controlling instrument or potential-indicator is to automatically stop the operation of the machine when the current rises above or falls below a predetermined degree, but said instrument is included in circuit with the magnet 158, so that simultaneously with the locking of the machine the inaccurately-weighed load may be deflected by the overload-discharge attachment outside of the plane of the passage for correct weighings. The overload-discharge attachment may be thus brought into play by the action of the current-controlling instrument or potential-indicator, as well as by the action of the circuit-closer 159.

As already explained, the improvements which we claim in connection with the current-controlling instrument are the adjustable circuit-closing devices, the manner of mounting these devices, and connecting the same with the other electrical parts of the machine, as it is not our purpose to restrict our application to any particular form of voltmeter or potential-indicator, as if it should be necessary to regulate the current in amperes an ammeter may be substituted for the voltmeter shown or the permanent magnet 199 may be attached to the index arm or pointer of any suitable counting mechanism and the circuit-closing device adjusted in connection with the dial, so that the machine can be stopped after a certain number of weighings.

While the preferred construction of the machine has been described, it will be understood that several modifications of the hopper-body 34 may be resorted to without departing from the spirit or principle of the present invention, and one of these modifications is illustrated in Figs. 23, 24, and 25 of the drawings.

In the modification shown in Figs. 23, 24, and 25 the hopper-body is provided with a pair of bulk-chambers $36^a$, arranged side by side, such construction being used when it is desired to weigh several sizes of packages on one machine, and it will of course be understood that this idea may be extended by using the upright bulk-chambers in couples or in groups and in connection with one or more drip-chambers. However, in the modification referred to a single drip-chamber $64^a$ is employed, which drip-chamber is provided with the same interior parts and the same discharge-valve mechanism as the drip-chamber illustrated in Figs. 1 and 4 of the drawings. In the modification the single drip-chamber $64^a$ is arranged at one side and in a plane between the two upright bulk-chambers $36^a$, and each of these bulk-chambers is provided at its upper end with a separate supply-compartment $49^a$, having at its lower side a feed-opening $51^a$, covered and uncovered by a cut-off valve $52^a$, secured to the inner end of a valve-rod 201, the outer end of which valve-rod is pivotally connected to the upper end of a lever 202, the lower end of which lever is connected with the valve-rod 203 for the lower cut-off-valve plate 204, designed to cover and uncover the discharge-opening $62^a$ at the lower end of the bulk-chamber $36^a$. The valve-rods 201 and 203 for the valves of both of the bulk-chambers $36^a$ are coupled together, so as to move in unison with the lever 202, which is pivotally supported intermediate its ends and has connected thereto at one side of the pivot the adjusting-rod 60, which connects with the controlling-lever 32. The movement of this controlling-lever provides for the alternate operation of the valves $52^a$ and 204 in the same manner as the valves 52 and 57 of the preferred form of feeder shown in Figs. 1 and 4 of the drawings.

In the modification shown in Figs. 23, 24, and 25 the capacity of each bulk-chamber is varied by means of an adjustable front wall or plate 205, having fitted to the side edges thereof slide-bars 206, working in slideways 207, formed at opposite sides of the bulk-chamber $36^a$, and said sides of the bulk-chamber are extended forward to form a front extension, within which the front wall or plate 205 works, the adjustment of said plate being secured by means of an adjusting-screw 208, working in a threaded opening formed in a cross-bar 209, connecting the front edges of the extensions of the side plates. The adjustable front wall or plate 205 has pivoted to its lower edge the upper edge of a pivotal deflecting-plate 210, whose lower edge normally rests and works upon the inclined bottom plate 211 of the chamber $36^a$, which bottom plate, in connection with the plate 210, provides for deflecting the bulk of material through the bottom discharge-opening $62^a$.

In Fig. 26 is shown a modification of the hopper-body similar in all respects to the modification shown in Figs. 23, 24, and 25 with the exception of the means for varying the size or capacity of the bulk-chamber $36^a$, and this is accomplished in the construction shown in Fig. 26 through the medium of the hinged front plates 212 and 213, which plates correspond in adjustment and function to the regulating-plates 41 and 42. (Shown in Fig. 4 of the drawings.) The plate 212, which is outermost, is hinged at its lower edge, as at 214, to the front side of the chamber $36^a$, and the innermost plate 213 is hinged at its upper edge to the outer plate 212 near the upper edge of the latter, and said outer plate 212 has projected inwardly from the side edges thereof the wing-plates 215, which wing-plates form a front extension for the bulk-chamber $36^a$ and confine therebetween the inner plate 213, which is adjusted by means of the adjusting-screw 216, mounted in the outer plate 212. The latter plate is adjusted in unison with the plate 213 by means of the main adjusting-screw 217, working through the plate 212 at its upper edge and engaging with the top portion of the chamber $36^a$.

A further modification of the bulk-chamber, showing different means for varying the size or capacity thereof, is illustrated in Figs. 27 and 28 of the drawings. In this modification the bulk-chamber is shown used independently without the separate drip-chamber and is provided at its front side with an adjustable front wall 218, having inwardly-projecting wing-plates 219, working within the opposite sides of the bulk-chamber and carrying obliquely-disposed slide-bars 220, working in inclined slide grooves or ways 221, formed at opposite sides of the bulk-chamber. The said adjustable front wall 218, including its side wing-plates 219, are designed to slide at their lower ends directly on the inclined bottom plate 211 of the bulk-chamber, so as to close in the bottom portion of the bulk-chamber at one side of the bottom discharge-opening $62^a$, and at its upper edge the said front wall 218 has hinged thereto a segmental closure-hood 222, whose sector-shaped wing-plates 223 are designed to project into the top portion of the front opening of the bulk-chamber, within which the adjustable front works.

The adjustable front 218 219 of the bulk-chamber 36ª may be secured in its adjusted position by means of suitably-located set-screws 224, and the upper end of the closure-hood 222 may be held against the front of the chamber 36ª, at the top thereof, by means of a set-screw 225, mounted in a short arm extension 226, projecting from the hinged or pivoted end of the hood and bearing against the outer side of the front plate 218 when such plate is adjusted inward to the position shown in Fig. 28 of the drawings. An additional regulating-plate 227, controlled by an adjusting-screw 228, is arranged within the bulk-chamber 36ª at the rear side thereof.

Various other modifications will readily suggest themselves to those skilled in the art, and we will have it understood that changes in the form, proportion, and the minor details of construction may be resorted to without departing from the principle or sacrificing any of the advantages of this invention.

Having thus described the invention, what is claimed as new, and desired to be secured by Letters Patent, is—

1. In a weighing-machine, the combination with the scale-beam, of a separate bracket supported by the scale-beam and connected therewith above and in vertical alinement with its check-rod connection, said bracket being extended at each side of its supporting connection with the scale-beam, a counterbalance-weight adjustable on one end portion of the bracket, and a weighing-receptacle attached directly to the other end portion of the bracket and counterbalanced by said weight, substantially as set forth.

2. In a weighing-machine, the weighing-receptacle, a weighing-wheel mounted in the receptacle and carrying a notched disk on one of its axle extremities, a gravity-latch having its free end normally engaging the notches of said disk, a release-lever pivoted intermediate its ends on the receptacle and having one end normally engaging beneath the free end of the latch, a trip-lever supported beyond and independently of one end of the release-lever, and means for automatically operating said trip-lever to carry the same against the contiguous end of the release-lever and rock the same on its pivot, substantially as set forth.

3. In a weighing-machine, the weighing-receptacle, a weighing-wheel mounted in the receptacle and carrying a notched disk on one of its axle extremities, a gravity-latch arm having its free end engaging the notches of said disk, a release-lever mounted intermediate its ends on the receptacle and having one end normally engaging the free end of the latch-arm, a pivotal cam-plate fitted to the opposite end of the release-lever, a trip-lever supported in a fixed position and adapted to engage said cam-plate, and means for automatically operating said trip-lever, substantially as set forth.

4. In a weighing-machine, the weighing-receptacle, a weighing-wheel mounted in the receptacle and carrying a notched disk on one of its axle extremities, a gravity-latch arm having its free end engaging the notches of said disk, a release-lever mounted intermediate its ends on the receptacle and having one end normally engaging the free end of the latch-arm, a stop-spring arranged above the release-lever at one side of its pivot, a pivotal cam-plate mounted on the outer projecting end of the release-lever and provided with a flat upper side and a round lower side, a stop-plate secured to the release-lever above the inner end of the cam-plate, a pressure-spring bearing on the said cam-plate to normally hold the same against the stop-plate, a bell-crank trip-lever supported in a fixed position and adapted to have its upper horizontally-disposed member engage the outer projecting portion of the cam-plate, and an automatically-controlled lever having a link connection with the pendent member of the trip-lever, substantially as set forth.

5. In a feeder for weighing-receptacles, the hopper-body provided with a bulk-chamber having a movable wall, means for holding said wall in variable positions, and a separate plate having a hinge-support at its upper end within the bulk-chamber, and coöperating with said wall to vary the capacity of the chamber and deflect the material toward the discharge-port thereof, substantially as set forth.

6. In a feeder for weighing-receptacles, the hopper-body provided with a bulk-chamber having a plurality of adjustable walls or plates for varying the capacity thereof, means for adjusting said walls or plates in unison, and separate means for independently adjusting one of the said walls or plates, substantially as set forth.

7. In a feeder for weighing-receptacles, the hopper-body provided with a bulk-chamber, a pair of movable regulating-plates hinged together and arranged to work within the chamber, one of said plates being hinged at its lower edge to a stationary part of the hopper-body, means for adjusting said plates in unison, and separate means for independently adjusting one of the plates, substantially as set forth.

8. In a feeder for weighing-receptacles, the hopper-body provided with a bulk-chamber having a pair of adjustable walls or plates arranged at the front thereof, means for adjusting said walls or plates in unison, and separate means for independently adjusting one of the walls or plates, substantially as set forth.

9. In a feeder for weighing-receptacles, the hopper-body provided with a bulk-chamber having a front extension, a pair of movable regulating-plates hinged together at their upper edges and arranged to work within said front extension, the outermost of said plates being hinged at its lower edge to the stationary front portion of the hopper-body, an adjusting-screw engaging with the outer of said plates to provide for the adjustment of both plates in unison, and a separate adjusting-screw mounted in the outer plate and engaging the inner plate to provide for the independent adjustment of the latter, substantially as set forth.

10. In a feeder for weighing-receptacles, the hopper-body provided with a bulk-chamber adapted to hold a bulk of material less in amount than the required weight, an independent drip-stream chamber arranged exterior to the bulk-chamber, and means for simultaneously covering and uncovering the outlets of both of said chambers, whereby the independent bulk and drip streams will flow into the weighing-receptacle at the same time, and the outlet-ports for both chambers will also be closed at the same time, substantially as set forth.

11. In a feeder for weighing-receptacles, the hopper-body provided with an upright bulk-chamber, a separate drip-stream chamber arranged exterior to the bulk-chamber, a plurality of vertically-alined, column-breaking cones supported within the drip-stream chamber, separate cut-off valves for the outlets of the bulk and drip-stream chambers, and common means for simultaneously opening and closing the cut-off valves for the bulk and drip-stream chambers, whereby the separate streams are permitted to flow at the same time, and the outlet-ports for both chambers will also be closed at the same time, substantially as set forth.

12. In a feeder for weighing-receptacles, a hopper-body provided with a bulk-chamber, a main drip-stream chamber, a secondary drip-stream chamber, said main and secondary drip-stream chambers having a common outlet, and means for deflecting the material into the secondary drip-stream chamber, substantially as set forth.

13. In a feeder for weighing-receptacles, the hopper-body provided with an upright bulk-chamber having a bottom discharge-opening, and a separate drip-chamber also having a bottom discharge-opening, separate cut-off valves arranged to respectively cover and uncover the discharge-openings of the bulk and drip chambers, and automatic means for simultaneously opening and closing said valves, substantially as set forth.

14. In a feeder for weighing-receptacles, the hopper-body provided with an upright bulk-chamber having a bottom discharge-opening and adapted to hold a bulk of material less than the complete amount to be weighed, and a separate drip or drip-stream chamber disposed at one side of the bulk-chamber and also having a bottom discharge-opening, separate cut-off valves arranged to respectively cover and uncover the bottom discharge-openings of the two chambers, and automatic means for simultaneously opening and closing both of said valves, substantially as set forth.

15. In a feeder for weighing-receptacles, a hopper-body provided with an upright bulk-chamber having a bottom discharge-opening, and with a separate drip-chamber also having a bottom discharge-opening, swinging cut-off valves respectively for the discharge-openings of both chambers, an automatically-operated controlling-lever, and common connections between the two valves and said controlling-lever to provide for simultaneously opening and closing said valve, substantially as set forth.

16. In a feeder for weighing-receptacles, a hopper-body provided with an upright bulk-chamber having a bottom discharge-opening, and with a separate drip-chamber having a bottom discharge-neck provided with an inclined valve-seat, a swinging cut-off valve arranged to cover and uncover the discharge-opening for the bulk-chamber, an oscillatory valve-lever carrying at one end a valve adapted to move laterally over the valve-seat at the bottom of the drip-chamber, an automatically-operated controlling-lever, an adjusting-rod connection between said controlling-lever and the swinging cut-off valves, and a coupling connection between said adjusting-rod and one end of the oscillatory valve-lever, substantially as set forth.

17. In a feeder for weighing-receptacles, a hopper-body provided with an upright bulk-chamber, a main drip-stream chamber, a secondary drip-stream chamber, and means for deflecting the material into the secondary drip-stream chamber, substantially as set forth.

18. In a feeder for weighing-receptacles, a hopper-body provided with an upright bulk-chamber having a valved discharge-opening at its lower end, a main drip-chamber also having a valved discharge-opening at its lower end, a cut-off plate or valve arranged at an intermediate point within said main drip-chamber, and a secondary drip chamber or tube communicating at its opposite ends respectively with the upper and lower end portions of the main drip-chamber, substantially as set forth.

19. In a feeder for weighing-receptacles, a hopper-body provided with an upright bulk-chamber, a main drip-stream chamber, and a secondary drip-stream chamber or tube having an outlet through the discharge-opening of the main drip-stream chamber, substantially as set forth.

20. In a feeder for weighing-receptacles, a hopper-body provided with a bulk-chamber for the main load of material, a main drip-chamber having an independent discharge-opening, and a secondary drip-chamber having an outlet through the discharge-opening of the main drip-chamber, and yielding baffle or resisting plates arranged at spaced points within the secondary drip-chamber, substantially as set forth.

21. In a feeder for weighing-receptacles, a hopper-body provided with a bulk-chamber for the main load of material, a main drip-chamber having an independent discharge-opening, and a secondary drip-chamber curved inwardly at its upper and lower ends toward the main drip-chamber and having an outlet through the discharge-opening of said main drip-chamber, and pivotal weighted upper and lower baffle or resisting plates hung respectively within the upper and lower bends of the secondary drip-chamber, substantially as set forth.

22. In a feeder for weighing-receptacles, a hopper-body provided with a bulk-chamber, a separate main drip-chamber having an independent discharge-opening, and a secondary drip-chamber having an outlet through the discharge-opening of the main drip-chamber, and a retarding worm or screw arranged in the vertical portion of the secondary drip-chamber, substantially as set forth.

23. In a feeder for weighing-receptacles, a hopper-body provided with a bulk-chamber, a separate drip-chamber, and a retarding worm or screw removably supported within said drip-chamber, substantially as set forth.

24. In a feeder for weighing-receptacles, a hopper-body provided with a bulk-chamber and with a separate drip or drip-stream chamber, valves for covering and uncovering the discharge-openings of said chambers, a retarding worm or screw supported for rotation within the drip-chamber, and means for opening and closing said valves and simultaneously starting and stopping the rotation of said worm or screw, substantially as set forth.

25. In a feeder for weighing-receptacles, a hopper-body provided with a bulk-chamber and with a separate drip or drip-stream chamber, valves for covering and uncovering simultaneously, the discharge-openings of said chambers, a retarding worm or screw supported for rotation within the drip or drip-stream chamber and having a gear connection at its upper end, a swinging gearing-frame carrying gears adapted to be thrown in and out of mesh with the gearing connection for the retarding worm or screw, an automatically-operated controlling-lever, and connections between said controlling-lever and the valves, and the swinging gearing-frame to provide for the simultaneous adjustment of these parts, substantially as set forth.

26. In a feeder for weighing-receptacles, a hopper provided with a bulk-chamber, a separate drip-chamber, and a revoluble retarding worm or screw arranged within said drip-chamber, substantially as set forth.

27. In a feeder for weighing-receptacles, the combination of a hopper-body provided with a bulk-chamber, a main drip-stream chamber, and a secondary drip-stream chamber, said latter chamber having an exterior jarring projection rigid therewith, and a suitably-operated hammer, adapted to be vibrated against said projection, when the hopper is feeding, substantially as set forth.

28. In a feeder for weighing-receptacles, a hopper-body provided with a bulk-chamber, and a separate drip or drip-stream chamber arranged at one side of the bulk-chamber, separate valves connected for simultaneous movement and adapted respectively to cover and uncover the bottom discharge-opening for the two chambers, and an axially, vertically, and horizontally adjustable column-breaking plate supported directly beneath and in close proximity to the discharge-opening of the drip or drip-stream chamber, substantially as set forth.

29. In an automatic weighing-machine, the combination with the scale mechanism carrying the weighing-receptacle and the feeder having a movable cut-off valve, alined solenoids having a common reciprocatory core, lever connections between this core and said cut-off valve, a current-reversing circuit-closing device having a metallic contact-arm, a permanent magnet carried by the scale or beam mechanism in a plane above said contact-arm to influence the latter in one direction, and means for causing the alternate magnetization of the separate solenoids by the action of said current-reversing circuit-closing device, substantially as set forth.

30. In an automatic weighing-machine, the combination with the scale or beam mechanism carrying the weighing-receptacle, and the feeder having the movable cut-off valve, of alined solenoids having a common core operatively connected with said cut-off valve, a current-reversing circuit-closing device having spaced contacts and a metallic contact-arm adapted to engage either of said contacts, a permanent magnet carried by the scale or beam mechanism and arranged in a plane to influence the movement of the contact-arm in one direction, and means for causing the alternate magnetization of the separate solenoids by the action of the said circuit-closing device, substantially as set forth.

31. In an automatic weighing-machine, the combination with the weighing mechanism and the feeder having the cut-off valve, of an electromagnetic controlling device having an operative connection with said cut-off valve, a current-reversing circuit-closing device having a metallic contact-arm, a permanent magnet carried by the beam mechanism and arranged in a plane to influence the movement of the contact-arm, and means for causing the alternate magnetization of the separate solenoids by the action of said circuit-closing device, substantially as set forth.

32. In an automatic weighing-machine, the combination with the scale or beam mechanism carrying the weighing-receptacle and the feeder having the movable cut-off valve, separate solenoids having a core operatively connected with said cut-off valve, a current-reversing circuit-closing device comprising a supporting-standard having an adjustable base-support and provided with an arm carrying at one end a vertically-disposed yoke having at its extremities oppositely-disposed contact-screws, and a metallic movable contact-arm adjustably supported at one end on the standard and having its other free end normally in contact with one of said contact-screws, a swinging permanent magnet carried by the scale or beam mechanism and arranged in a plane to influence the movement of the contact-arm in a direction toward and against one of said contact-screws, and means for causing the alternate magnetization of the separate solenoids by the action of said circuit-closing device, substantially as set forth.

33. In an automatic weighing-machine, the combination with the scale or beam mechanism carrying the weighing-receptacle, and a feeder having a movable cut-off valve, of separate solenoids having a core operatively connected with said cut-off valve, a current-reversing relay instrument having circuit-wire connections with the main conductors and the separate solenoids, and a circuit-closing device controlled by the movement of the scale or beam mechanism and included in a separate local circuit with said relay instrument, substantially as set forth.

34. In an automatic weighing-machine, the combination with the scale or beam mechanism carrying the weighing-receptacle, and a feeder having a movable cut-off valve, of separate solenoids having a core operatively connected with said cut-off valve, a current-reversing relay instrument having circuit-wire connections with the main conductors and the separate solenoids, a circuit-closing device having spaced contacts and a movable metallic contact-arm included in a separate local circuit with the magnets of said relay instrument, and a permanent magnet carried by the scale or beam mechanism and arranged in a plane to influence the movement of said contact-arm in one direction, substantially as set forth.

35. In an automatic weighing-machine, the combination with a scale or beam mechanism carrying the weighing-receptacle, and a feeder having a movable cut-off valve, of separate solenoids having a core operatively connected with said cut-off valves, a current-reversing relay instrument comprising a base carrying a pair of spaced magnets, an offstanding arm having a cross-head carrying at its opposite ends oppositely-disposed contact-screws, and a swinging armature pivotally supported between the magnets and working between the contact-screws, suitable circuit-wire connections including the solenoids and the armature and contact-screws of said relay instrument, and a circuit-closing device controlled by the movement of the scale or beam mechanism and included in a separate local circuit with the magnets of the relay instrument, substantially as set forth.

36. In an automatic weighing-machine, the combination with the scale mechanism and the weighing-receptacle, of means, set in action by said scale mechanism, for automatically deflecting an overload from the receptacle as it discharges therefrom, substantially as set forth.

37. In a weighing-machine, the combination with the weighing-receptacle and the scale mechanism, of an overload-discharge attachment arranged below the outlet of said weighing-receptacle, and means, set in action by the scale mechanism, for automatically deflecting an overload from said receptacle to a point outside of the plane of the passage for correct weighings, substantially as set forth.

38. In a weighing-machine, the combination with the weighing-receptacle, of a stationary discharge-spout arranged below the outlet of said receptacle and having a lateral overload-discharge passage, a deflecting-gate normally closing said overload-discharge passage, and means for automatically releasing said gate when an overload occurs in the weighing-receptacle, substantially as set forth.

39. In a weighing-machine, the combination with the weighing-receptacle, of a stationary discharge-spout arranged below the outlet of said receptacle and having a lateral overload-discharge passage, a deflecting-gate normally closing said overload-discharge passage, means for automatically releasing said gate when an overload occurs in the weighing-receptacle, and means for automatically resetting the gate in its closed position, substantially as set forth.

40. In a weighing-machine, the combination with the weighing-receptacle, of a stationary discharge-spout arranged below the outlet of said receptacle and having a lateral overload-discharge passage, a deflecting-gate normally closing said overload-discharge passage, an armature latch-arm having a catch engagement at one end with said gate, a release-magnet arranged adjacent to one end of said armature latch-arm, and a circuit-closing device actuated by the movement of the scale or beam mechanism beyond the balance-point and included in a local-battery circuit with said release-magnet, substantially as set forth.

41. In a weighing-machine, the combination with the weighing-receptacle, and the scale or beam mechanism carrying the same, of a stationary discharge-spout arranged below the outlet of said receptacle and having a lateral overload-discharge passage, an armature latch-arm having a catch engagement with said gate, a release-magnet for disengaging said armature latch-arm from the gate, a circuit-closing device arranged adjacent to the scale or beam mechanism and having its contacts normally separated, one of said contacts being a metallic movable arm, a permanent controlling-magnet connected with the scale or beam mechanism and arranged in a plane so as to come within the zone of influence for the contact-arm only when the scale-beam rises above its balance-point under the influence of an overload in the weighing-receptacle, and a local-battery circuit including said circuit-closing device and the release-magnet, substantially as set forth.

42. In a weighing-machine, the combination with the weighing-receptacle and the feeder having the cut-off valve, of a stationary discharge-spout having a lateral overload-discharge passage, a deflecting-gate normally closing said passage, means for automatically releasing said gate when an overload occurs in the weighing-receptacle, an automatically-operated controlling-lever having operative connection with said cut-off valve, and a re-setting device for the deflecting-gate having a rod connection with said controlling-lever, substantially as set forth.

43. In an automatic weighing-machine, the combination with the scale or beam mechanism carrying the weighing-receptacle, and the feeder having a movable cut-off valve, of separate solenoids having a core operatively connected with said cut-off valve, current-reversing mechanism for automatically shifting the electric current alternately from one solenoid to the other, an electromagnetic circuit-cut-off instrument having wire connections with said current-reversing mechanism and the solenoids, and a separate local circuit having an automatically-controlled circuit-closer and including therein the controlling-magnet for said cut-off instrument, substantially as set forth.

44. In an automatic weighing-machine, the combination with the scale or beam mechanism carrying the weighing-receptacle, and the feeder having the movable cut-off valve, current-reversing mechanism for automatically shifting the electric current from one solenoid to the other, an electromagnetic circuit-cut-off instrument having a pair of oppositely-located contact-posts carrying contact-plates, a pivotal armature contact-arm normally in contact with one of said contact-plates, an electromagnet for controlling one end of said armature contact-arm, and a spring-actuated shouldered catch-arm adapted to engage one end of the armature contact-arm when drawn against the adjacent contact-plate by the armature, circuit-wire connections between the contacts and armature of said circuit-cut-off instrument and the current-reversing mechanism of the solenoids, and a separate local circuit having an automatically-controlled circuit-closer and including therein the controlling-magnet for said cut-off instrument, substantially as set forth.

45. In an automatic weighing-machine, the combination with the weighing mechanism, and the electrically-controlled means for automatically operating the valve mechanism of the feeder, of means for automatically locking the valve mechanism in its closed position when the current supplied rises above or falls below prescribed limits, substantially as set forth.

46. In an automatic weighing-machine, the combination with the weighing mechanism, and the electrically-controlled means for automatically operating the valve mechanism of the feeder, of a circuit-cut-off instrument having means for operating said electrically-controlled means to lock the valve mechanism in its closed position, and a current-controlling instrument having wire connections with the main conductors and provided with circuit-closing devices included in the separate local circuit with said circuit-cut-off instrument, substantially as set forth.

47. In an automatic weighing-machine, the combination with the weighing mechanism, the feeder having a movable cut-off valve, and the separate solenoids having a core operatively connected with said valve, of a circuit-cut-off instrument having means for a continuous closing of the circuit through the solenoids which holds said valves closed, a current-controlling instrument having wire connections with the main conductors, and provided with a dial and a swinging index-arm carrying a permanent magnet, a pair of adjustable circuit-closers having an axial adjustment on the axis of the index-arm and each provided with normally-separated contacts one of which is a movable arm, and with a pointer overhanging said dial, the corresponding contacts of both circuit-closers having corresponding circuit-wire connections, said circuit-wire connections being included in a separate local circuit with said cut-off instrument, substantially as set forth.

48. In an automatic weighing-machine, the combination with the weighing-receptacle and the electrically-controlled means for automatically operating the valve mechanism of the feeder, of a discharging device having means for deflecting an incorrect weighing, a circuit-cut-off instrument having means for locking the valve mechanism in its closed position, and a current-controlling instrument, affected by fluctuations in the current, and having means for setting into action the circuit-cut-off instrument, and also the operating part of said discharge attachment, substantially as set forth.

49. In a feeder for weighing-receptacles, the bulk-chamber adapted to hold a bulk of material less in amount than the required weight, and provided with suitably-spaced feed and discharge openings, separate cut-off valves arranged to alternately cover and uncover said feed and discharge openings, one of said valves being closed while the other is open, a separate drip-stream chamber, a cut-off valve for the outlet of said drip-stream chamber, and means for simultaneously operating the several cut-off valves whereby the drip-stream will flow at the same time the bulk of material is dropped into the weighing-receptacle, and will also be cut off at the time of closing the outlet and opening the inlet for the bulk-chamber, substantially as set forth.

In testimony that we claim the foregoing as our own we have hereto affixed our signatures in the presence of two witnesses.

JOHN OUTCALT.
DAVID DE PYSTER ACKER OUTCALT.

Witnesses:
J. G. DENEESBECK,
JOSEPH HODAPP, Jr.